(12) United States Patent
Chapman et al.

(10) Patent No.: US 12,312,155 B2
(45) Date of Patent: May 27, 2025

(54) BEVERAGE PREPARATION SYSTEM, A CAPSULE AND A METHOD FOR FORMING A BEVERAGE

(71) Applicant: Koninklijke Douwe Egberts B.V., Utrecht (NL)

(72) Inventors: Andrew Chapman, Peterborough (GB); Stuart Banister, Peterborough (GB); Simon Jelley, Cambridge (GB); Esak Shabudin, Banbury (GB); Andrew Halliday, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 16/372,187

(22) Filed: Apr. 1, 2019

(65) Prior Publication Data

US 2019/0225415 A1    Jul. 25, 2019

Related U.S. Application Data

(63) Continuation of application No. 14/786,142, filed as application No. PCT/IB2014/000858 on May 16, 2014, now Pat. No. 10,273,076.

(30) Foreign Application Priority Data

May 17, 2013 (GB) ..................... 1308925
May 17, 2013 (GB) ..................... 1308929

(51) Int. Cl.
  *B65D 85/804* (2006.01)
  *A47J 31/36* (2006.01)
  *A47J 31/40* (2006.01)

(52) U.S. Cl.
  CPC .......... *B65D 85/8043* (2013.01); *A47J 31/36* (2013.01); *A47J 31/407* (2013.01)

(58) Field of Classification Search
  CPC ...... B65D 85/8043; A47J 31/407; A47J 31/36
  See application file for complete search history.

(56) References Cited

U.S. PATENT DOCUMENTS

| | | | |
|---|---|---|---|
| 2,968,560 | A | 1/1961 | Goros |
| 3,233,813 | A | 2/1966 | James |

(Continued)

FOREIGN PATENT DOCUMENTS

| | | |
|---|---|---|
| CA | 2046558 | 1/1992 |
| CA | 2067515 | 2/1999 |

(Continued)

OTHER PUBLICATIONS

Notification of the First Office Action mailed Apr. 16, 2020, for Chinese Application No. 201910379467.4, with English Translation (15 pgs.).

(Continued)

*Primary Examiner* — Drew E Becker
*Assistant Examiner* — Chaim A Smith
(74) *Attorney, Agent, or Firm* — Fitch, Even, Tabin & Flanner LLP

(57) ABSTRACT

A beverage producing system is provided comprising a capsule containing beverage ingredients and a beverage preparation machine.
The capsule comprises a cup-shaped body and a lid; the cup-shaped body having a base and a side wall and the lid being sealed to the cup-shaped body.
Prior to insertion, the side wall comprises:
  an annular trough being dimensioned to receive an enclosing member of the beverage preparation machine on movement of the enclosing member into a closed position;
  a first side wall section extending between the base and the annular trough; and (Continued)

a second side wall section extending between the annular trough and a rim of the capsule.

A cup-shaped body, a capsule and a method are also disclosed.

35 Claims, 16 Drawing Sheets

(56) References Cited

U.S. PATENT DOCUMENTS

| | | | |
|---|---|---|---|
| 3,987,720 | A | 10/1976 | Hill |
| 4,513,015 | A | 4/1985 | Clough |
| 4,762,514 | A | 8/1988 | Yoshida |
| 4,865,217 | A | 9/1989 | Yoshimoto |
| 5,098,751 | A | 3/1992 | Tamura |
| 5,178,293 | A | 1/1993 | Suzuki |
| 5,242,702 | A | 9/1993 | Fond |
| 5,656,311 | A | 8/1997 | Fond |
| 5,897,899 | A | 4/1999 | Fond |
| 5,948,455 | A | 9/1999 | Schaeffer |
| 6,371,335 | B1 | 4/2002 | MacEwen |
| 6,461,697 | B1 | 10/2002 | Slat |
| 7,556,191 | B2 | 7/2009 | Hewitt |
| 7,658,141 | B2 | 2/2010 | Masek |
| 8,161,866 | B2 | 4/2012 | Kollep |
| 2001/0041702 | A1 | 11/2001 | Crocker |
| 2003/0071056 | A1 | 4/2003 | Hale |
| 2003/0217644 | A1 | 11/2003 | Jarisch |
| 2005/0109653 | A1 | 5/2005 | Wnek |
| 2006/0110507 | A1 | 5/2006 | Yoakim |
| 2008/0299262 | A1 | 12/2008 | Reati |
| 2009/0320692 | A1 | 12/2009 | Simanski |
| 2010/0015307 | A1 | 1/2010 | Abegglen |
| 2010/0064899 | A1 | 3/2010 | Aardenburg |
| 2010/0239717 | A1 | 9/2010 | Yoakim |
| 2011/0020500 | A1 | 1/2011 | Eichler |
| 2011/0041702 | A1 | 2/2011 | Yoakim |
| 2011/0185910 | A1 | 8/2011 | Ryser |
| 2011/0186450 | A1 | 8/2011 | Bonacci |
| 2011/0272317 | A1 | 11/2011 | Wnek |
| 2011/0297005 | A1 | 12/2011 | Mariller |
| 2012/0031794 | A1 | 2/2012 | Ozanne |
| 2012/0210878 | A1 | 8/2012 | Mariller |
| 2012/0225168 | A1 | 9/2012 | Kamerbeek |
| 2012/0272830 | A1 | 11/2012 | Gugerli |
| 2012/0301581 | A1 | 11/2012 | Abegglen |
| 2013/0087051 | A1 | 4/2013 | Frydman |
| 2013/0092910 | A1 | 4/2013 | Seo |
| 2013/0341478 | A1 | 12/2013 | Mariller |
| 2014/0087028 | A1 | 3/2014 | Orsi |
| 2014/0234494 | A1 | 8/2014 | Doglioni Majer |
| 2016/0066591 | A1 | 3/2016 | Halliday |
| 2016/0075506 | A1 | 3/2016 | Chapman |
| 2016/0083174 | A1 | 3/2016 | Halliday |
| 2016/0192805 | A1 | 7/2016 | Etter |

FOREIGN PATENT DOCUMENTS

| | | |
|---|---|---|
| CN | 1479692 | 3/2004 |
| CN | 101043835 | 9/2007 |
| CN | 101287662 | 10/2008 |
| CN | 101432118 | 5/2009 |
| CN | 101432207 | 5/2009 |
| CN | 101454227 | 6/2009 |
| CN | 101686771 | 3/2010 |
| CN | 101970314 | 2/2011 |
| CN | 101992905 | 3/2011 |
| CN | 101992906 | 3/2011 |
| DE | 3641127 | 6/1988 |
| DE | 69200472 | 2/1995 |
| DE | 69028628 | 1/1997 |
| DE | 102008014758 | 10/2009 |
| EP | 0041931 | 12/1981 |
| EP | 0468078 | 1/1992 |
| EP | 0468079 | 1/1992 |
| EP | 468080 | 1/1992 |
| EP | 512468 | 11/1992 |
| EP | 521186 | 1/1993 |
| EP | 0521510 | 1/1993 |
| EP | 524464 | 1/1993 |
| EP | 1344724 | 9/2003 |
| EP | 1440908 | 7/2004 |
| EP | 1369069 | 1/2006 |
| EP | 1654966 | 12/2006 |
| EP | 1700548 | 8/2007 |
| EP | 1839543 | 10/2007 |
| EP | 1816936 | 7/2008 |
| EP | 2029457 | 3/2009 |
| EP | 1849715 | 7/2009 |
| EP | 2098144 | 9/2009 |
| EP | 2165937 | 3/2010 |
| EP | 2279845 | 2/2011 |
| EP | 2284101 | 2/2011 |
| EP | 2289820 | 3/2011 |
| EP | 2308776 | 4/2011 |
| EP | 2100824 | 5/2011 |
| EP | 2284100 | 6/2011 |
| EP | 2347976 | 7/2011 |
| EP | 2151313 | 10/2011 |
| EP | 2374383 | 10/2011 |
| EP | 2210827 | 9/2012 |
| EP | 2562101 | 2/2013 |
| EP | 2287090 | 5/2013 |
| EP | 2607264 | 6/2013 |
| EP | 2631198 | 8/2013 |
| EP | 2631199 | 8/2013 |
| EP | 2650234 | 10/2013 |
| EP | 2489609 | 11/2013 |
| EP | 2712824 | 4/2014 |
| EP | 2721971 | 4/2014 |
| EP | 2757055 | 7/2014 |
| EP | 2757056 | 7/2014 |
| EP | 2868598 | 5/2015 |
| EP | 2892400 | 7/2015 |
| EP | 2960181 | 12/2015 |
| EP | 2570369 | 11/2016 |
| ES | 1076496 | 3/2012 |
| ES | 1077395 | 7/2012 |
| ES | 1078818 | 3/2013 |
| FR | 2617389 | 1/1989 |
| GB | 1561188 | 2/1980 |
| JP | H05132056 A | 5/1993 |
| JP | H05305360 | 11/1993 |
| JP | 2007510598 | 4/2007 |
| JP | 2008517838 | 5/2008 |
| JP | 2009538652 | 11/2009 |
| JP | 4399022 | 1/2010 |
| JP | 2010120161 | 6/2010 |
| JP | 2012515601 | 7/2012 |
| JP | 2012530527 | 12/2012 |
| JP | 2015511506 | 4/2015 |
| JP | 2015526146 | 9/2015 |
| JP | 2015527914 | 9/2015 |
| KR | 20100049650 | 5/2010 |
| KR | 20120030538 | 3/2012 |
| KR | 20120121880 | 11/2012 |
| WO | 9729968 | 8/1997 |
| WO | 0226588 | 4/2002 |
| WO | 2004064585 | 8/2004 |
| WO | 2005047126 | 5/2005 |
| WO | 2005066040 | 7/2005 |
| WO | 2006045515 | 5/2006 |
| WO | 2006045536 | 5/2006 |
| WO | 2006045537 | 5/2006 |
| WO | 2007039032 | 4/2007 |
| WO | 2007122208 | 11/2007 |
| WO | 2007137974 | 12/2007 |
| WO | 2008078988 | 1/2008 |
| WO | 2008019203 | 2/2008 |
| WO | 2008148646 | 12/2008 |
| WO | 2008148650 | 12/2008 |
| WO | 2008155749 | 12/2008 |
| WO | 2009115474 | 9/2009 |

(56) References Cited

FOREIGN PATENT DOCUMENTS

| | | |
|---|---|---|
| WO | 2010006936 | 1/2010 |
| WO | 2010034663 | 4/2010 |
| WO | 2010063644 | 6/2010 |
| WO | 2010066705 | 6/2010 |
| WO | 2010076048 | 7/2010 |
| WO | 2010084475 | 7/2010 |
| WO | 2010116284 | 10/2010 |
| WO | 2010128844 | 11/2010 |
| WO | 2010137946 | 12/2010 |
| WO | 2010137954 | 12/2010 |
| WO | 2011010263 | 1/2011 |
| WO | 2011061126 | 5/2011 |
| WO | 2011092301 | 8/2011 |
| WO | 2012100836 | 8/2012 |
| WO | 2012100976 | 8/2012 |
| WO | 2012104760 | 8/2012 |
| WO | 2012118367 | 9/2012 |
| WO | 2012120459 | 9/2012 |
| WO | 2012127233 | 9/2012 |
| WO | 2012144885 | 10/2012 |
| WO | 2013046014 | 4/2013 |
| WO | 2013053655 | 4/2013 |
| WO | 2013060918 | 5/2013 |
| WO | 2013092910 | 6/2013 |
| WO | 2013132435 | 9/2013 |
| WO | 2013136209 | 9/2013 |
| WO | 2013157924 | 10/2013 |
| WO | 2014012779 | 1/2014 |
| WO | 2014012783 | 1/2014 |
| WO | 2014029803 | 2/2014 |
| WO | 2014067507 | 5/2014 |
| WO | 2014118812 | 8/2014 |
| WO | 2014184651 | 11/2014 |
| WO | 2014184652 | 11/2014 |
| WO | 2014184653 | 11/2014 |
| WO | 2015101394 | 7/2015 |
| WO | 2016075319 | 5/2016 |
| WO | 2020053075 | 3/2020 |

OTHER PUBLICATIONS

Amended claims as filed with the Japanese Patent Office on Nov. 29, 2016, for Japanese Patent Application No. 2016-512434, with English translation (20 pgs.).
Argument as filed with the Japanese Patent Office on Nov. 29, 2016, for Japanese Patent Application No. 2016-512434, with English translation (6 pgs.).
Chinese Patent Office, Office Action dated Mar. 28, 2017, from Chinese Patent Application No. 201480026319.X, with English translation (17 pgs.).
Chinese Search Report for Chinese Application No. 2014800263289, with English translation (3 pgs.).
Coffee Capsule Stress and Deformation Analysis Performed by Optunity Ltd. on Dec. 6, 2018 (10 pgs.).
Combined Search and Examination Report, dated Apr. 22, 2015, for Applicaiton No. GB1420262.6 (7 pgs.).
Combined Search and Examination Report, dated Mar. 1, 2016 for United Kingdom Patent Application No. GB1515478.4 (6 pgs.).
Combined Search and Examination Report, dated Oct. 10, 2013 for United Kingdom Patent Application No. GB1308929.7 (7 pgs.).
Examination Report No. 2 for Standard Patent Application, dated Feb. 24, 2017 for Australian Patent Application No. 2014266922 (5 pgs.).
Extract of the Wikipedia page on "Deformation (engineering)" bearing a date of Feb. 21, 2013, https://en.wikipedia.org/w/index.php?title=Deformation_(engineering)&oldid=539464480, retrieved on Jan. 25, 2019 (5 pgs.).
Extract of the Wikipedia page on "Drawing (manufacturing)" bearing a date of Feb. 26, 2013, https://en.wikipedia.org/w/index.php?title=Drawing_(manufacturing)&oldid=540469785, retrieved on Jan. 25, 2019 (3 pgs.).
Extract of the Wikipedia page on "Nespresso" bearing a date of Nov. 29, 2012, https://en.wikipedia.org/w/index.php?title=Nespresso&oldid=525539503, retrieved on Sep. 13, 2018 (D13 in Opposition) (8 pgs.).
International Search Report and Written Opinion of the International Searching Authority, date of mailing Jul. 29, 2014 for International Application No. PCT/IB2014/000858 (9 pgs.).
International Search Report, date of mailing Aug. 28, 2014, for International Application No. PCT/IB2014/000852 (6 pgs.).
International Search Report, date of mailing Feb. 10, 2016, and Written Opinion of the International Searching Authority for International Application No. PCT/EP2015/076620 (12 pgs.).
International Search Report, date of mailing Sep. 16, 2014, for International Application No. PCT/IB2014/000957 (5 pgs.).
Notice of Opposition to a European Patent, dated Feb. 2, 2019 for European Application No. 14730192.3 (42 pgs.).
Notice of Opposition to a European Patent, dated Feb. 4, 2019 for European Application No. 14730192.3 (10 pgs.).
Notice of Opposition to a European Patent, dated Feb. 4, 2019 for European Application No. 14730192.3 (20 pgs.).
Notice of Opposition to a European Patent, dated Jan. 31, 2019 for European Application No. 14730192.3 (34 pgs.).
Notice of Opposition to a European Patent, dated Oct. 11, 2018 for European Application No. 14730192.3 (7 pgs.).
Notice of Reasons For Rejection, dated Aug. 24, 2016 for Japanese Patent Application No. 2016-512434, with English translation (10 pgs.).
Notice of Reasons For Rejection, with English translation, dated Aug. 24, 2016 for Japanese Patent Application No. 2016-512435 (12 pgs.).
Notice of Reasons For Rejection, with English translation, dated Aug. 24, 2016 for Japanese Patent Application No. 2016-512436 (8 pgs.).
Notification of the First Office Action, dated May 31, 2016 for Chinese Patent Application No. 201480026631.9, with English translation (14 pgs.).
Patent Examination Report No. 1, dated Mar. 2, 2016 for Australian Patent Application No. 2014266922 (3 pgs.).
Patent Examination Report No. 1, dated May 5, 2016 for Australian Patent Application No. 2014266920 (3 pgs.).
Requisition by the Examinar, dated Apr. 8, 2016 for Canadian Patent Application No. 2901582 (3 pgs.).
Requisition by the Examinar, dated Jul. 19, 2016 for Canadian Patent Application No. 2901664 (4 pgs.).
Requisition by the Examinar, dated Jun. 20, 2016 for Canadian Patent Application No. 2901561 (3 pgs.).
Response to Office Action, with English translation, for Chinese Application No. 201480026631.9, dated Oct. 17, 2016 (27 pgs.).
Search Report, dated Oct. 1, 2013 for United Kingdom Patent Application No. GB1308925.5 (4 pgs.).
Statement of Grounds for Notice of Opposition Filed Against EP2996521, dated Oct. 11, 2018 for European Application No. 14730192.3 (124 pgs.).
The Hague District Court, Judgment in Preliminary Relief Proceedings in the matter between Koninklijke Douwe Eberts B.V., versus Belmoca BVBA, case No. C/09/555970/KG ZA 18-694, dated Dec. 28, 2018, with English translation (62 pgs.).
The State Intellectual Property Office of P.R. China, Notification of the First Office Action and Search Report, with English Summary, for Chinese Application No. 201580072290.3, dated Apr. 10, 2018 (10 pgs.).
Tribunal de Grande Instance de Paris, Judgment in Preliminary Relief Proceedings in the matter between Koninklijke Douwe Egberts B.V., versus Belmoca, case No. 352J-W-B7C-CNM2W, dated Jan. 24, 2019 (17 pgs.).
Written Opinion of the International Searching Authority for International Application No. PCT/IB2014/000852 (6 pgs.).
Response to the Oppositions filed against European patent No. EP2996521, dated Jun. 28, 2019 for European Application No. 14730192.3 (372 pgs.).
Notification of Reason for Refusal dated Aug. 6, 2019, for Korean Patent Application No. 10-2018-7030971, with English Translation (6 pgs.).

(56) References Cited

OTHER PUBLICATIONS

Examination Report, dated Aug. 30, 2019 for Australian Patent Application No. 2015344986 (3 pgs.).
Notice of Reasons for Rejection, mailed Aug. 22, 2019 for Japanese Patent Application No. 2017-525840, with English Translation (8 pgs.).
Notice of Reasons for Rejection, mailed Sep. 20, 2019 for Japanese Patent Application No. 2018-138423, with English Translation (16 pgs.).
Communication pursuant to Article 94(3) EPC and Annex to the Communication, dated Oct. 14, 2019 for European Application No. 14730191.5 (4 pgs.).
United Kingdom Application No. GB 1308929.7, filed May 17, 2013 (28 pgs.).
United Kingdom Application No. GB 1308925.5, filed May 17, 2013 (33 pgs.).
Annex to the Communication in Opposition Proceedings filed against European patent No. EP2996521, dated Sep. 10, 2019 for European Application No. 14730192.3 (28 pgs.).
Extract of the Wikipedia page on "Lamination" published Mar. 18, 2013, https://en.wikipedia.org/w/index.hp?title=Lamination&oldid=545193864, retrieved on Oct. 23, 2019 (3 pgs.).
Written Submission in Opposition Proceedings filed against European patent No. EP2996521, dated Jan. 31, 2020 for European Application No. 14730192.3 (23 pgs.).
Written Submission in Opposition Proceedings filed against European patent No. EP2996521, dated Jan. 29, 2020 for European Application No. 14730192.3 (68 pgs.).
Third Party Observations Under Article 115 EPC; dated Sep. 16, 2020; for European Patent Application No. EP14730191.5 (42 pgs.).
Consolidated List of Cited Opposition Documents dated Apr. 15, 2021, European Patent Application No. EP18169985.1 (2 pgs.).
Consolidated List of Opposition Documents dated May 19, 2021, European Application No. EP14730192.3 (2 pgs.).
Intention to Grant and text intended for grant dated May 14, 2021, European Patent Application No. 15797291.0 (60 pgs.).
Main and Auxiliary Requests dated May 21, 2021, European Patent No. 2996521 (175 pgs.).
Notice of Opposition against European patent EP 3375333 by Belmoca BVBA, dated Apr. 2, 2021, European Patent Application No. 18169985.1 (29 pgs.).
Notice of Opposition against European patent EP 3375333 by Caffitaly System S.p.A., dated Apr. 8, 2021, European Patent Application No. 18169985.1 (23 pgs.).
Notice of Opposition against European patent EP 3375333 by Delica AG, dated Feb. 3, 2021, European Patent Application No. 18169985.1 and English machine translation (112 pgs.).
Notice of Opposition against European patent EP 3375333 by Kruger GmbH & Co. KG, dated Apr. 6, 2021, European Patent Application No. 18169985.1 and English machine translation (48 pgs.).
Observations by Third Party dated Jan. 20, 2021; European Patent Application No. 20151759.6 (3 pgs.).
Observations by Third Party dated Sep. 15, 2021; European Patent Application No. 20151759.6 (86 pgs.).
Response to Opposition and Main Request dated Sep. 2, 2021, European Patent No. 3375333 (112 pgs.).
Results of Oral Proceedings of Jul. 22-23, 2021, dated Jul. 23, 2021, European Application No. 14730192.3 (1 pg.).
VB1—Described as Excerpts of a complaint dated Jul. 9, 2012 to the Federal Patent Court St. Gallen from Delica Opposition to European Patent Application No. EP18169985.1 (10 pgs.).
VB2—Described as Exhibits 1, 18 and 31 of complaint dated Jul. 9, 2012 to the Federal Patent Court St. Gallen, from Delica Opposition to European Patent Application No. EP18169985.1 (5 pgs.).
VB3—Described as Summons to oral hearing and peliminary opinion of the opposition division regardng EP3110721 dated Dec. 16, 2020, European Patent Application No. 15711865.4 from Delica Opposition to European Patent Application No. EP18169985.1 (9 pgs.).
VB4—Described as Overlapping capsule body of Café Royal capsules of 2012 with figure 7 of the patent in suit from Delica Opposition to European Patent Application No. EP18169985.1 (1 pg.).
VB5—Described as Overlapping capsule body of CaféRoyal capsules of 2012 with figure 13 of the patent in suit from Delica Opposition to European Patent Application No. EP18169985.1 (1 pg.).
VB6—Described as Compilation of documents on production, delivery of Café Royal capsules from 2012 from Delica Opposition to European Patent Application No. EP18169985.1 and color version (17 pgs.).
Written Decision on Registration dated Aug. 19, 2020, Korean Application No. KR20187030971 and English translation (4 pgs.).
Written Opinion dated Mar. 18, 2021, Brazilian Application No. BR112017010019 with English translation (8 pgs.).
Consolidated List of Cited Opposition Documents for European Patent EP2996966, dated Oct. 5, 2021, European Patent Application No. 14730191.5 (1 pg.).
Notice of Opposition against European Patent EP2996966 by Delica AG, dated Oct. 5, 2021, European Patent Application No. 14730191.5 (25 pgs.).
Notice of Opposition against European Patent EP2996966 by Societe Des Produits Nestle S.A., dated Oct. 5, 2021, European Patent Application No. 14730191.5 (33 pgs.).
Decision in Opposition Proceedings against European Patent EP2996521, dated Jan. 26, 2022; European Patent Application No. 14730192.3 (99 pgs.).
Statement of Grounds of Appeal dated Jun. 2, 2022, European Patent No. EP2996521 (40 pgs.).
Statement of Grounds of Appeal dated May 25, 2022, European Patent No. EP2996521 (38 pgs.).
Statement of Grounds of Appeal dated May 31, 2022, Euorpean Patent No. EP2996521 (14 pgs.).
Third Party Observation dated Apr. 6, 2022, European Patent No. EP3656259 (4 pg.).
Third Party Observation dated Jun. 1, 2022, Euorpean Patent No. EP3656259 (3 pgs.).
Information About Non-Relevance of Third-Party Observations dated Apr. 19, 2022, Euorpean Patent No. EP3656259 (1 pg.).
Reply to the patent proprietor's statement filed on Mar. 1, 2022, dated Aug. 16, 2022, Opposition against EP2996966. (35 pgs.).
Third Party Observations, dated Jun. 29, 2022, European Patent Application No. 20151759.6 (4 pgs.).
Summons to attend oral proceedings pursuant to Rule 115(1) EPC dated Aug. 11, 2022, European Application No. 14730191.5 (14 pgs.).
Letter from the Board of Appeal of the EPO dated Oct. 26, 2022 enclosing letter of patent proprietor dated Oct. 18, 2022, European Application No. 14730192.3 (148 pgs.).
EPO Brief Communication of Copies of Consolidated List (corrected version), dated Aug. 9, 2023, European Patent Application No./Patent No. 18169985.1 / 3375333 (3 pgs.).
EPO Communication dated Aug. 4, 2023, in response to the submissions in the letter from opponent 1 (Delica AG) dated Feb. 8, 2023, as well as to the Consolidated list of documents entered in the register on Feb. 9, 2023, European Patent Application No./Patent No. 18169985.1 / 3375333 (46 pgs.).
EPO Communication dated Jul. 25, 2023, in response to the Communication of the Board of Appeal pursuant to Article 15(1) of the RPBA, response to the preliminary, non-binding observations with clean and marked versions of Auxiliary Requests 1-6 which are renumbered versions of previously pending requests 6-9 and 12-13, European Patent Application No./Patent No. 14730192.3 / 2996521 (8 pgs.).
EPO Communication of notice of opposition, dated Aug. 14, 2023, European Patent Application No./Patent No. 20151759.6 / 3656259 (117 pgs.).

(56) References Cited

OTHER PUBLICATIONS

EPO Communication of notice of opposition, dated Aug. 16, 2023, European Patent Application No./Patent No. 20151759.6 / 3656259 (52 pgs.).
Written Submission in Opposition Proceedings filed against European Patent No. EP2996966, dated Feb. 16, 2023, European Application No. 14730191.5 (9 pgs.).
Written Submission in Opposition Proceedings filed against European Patent No. 2996966, dated Feb. 7, 2023, European Application No. 14730191.5 (7 pgs.).
Reply from the opponent to submission of proprietor filed against European Patent No. 3375333, dated Feb. 9, 2023, European Application No. 18169985.1 (42 pgs.).
Written submissions in opposition procedure against EP2996521, dated Aug. 22, 2024, European Patent Application No. 14730192.3 (8 pgs.).
Written submissions in opposition procedure against EP3656259, dated Sep. 26, 2024, European Patent Application No. 20151759.6 (21 pgs.).
Submissions in opposition proceedings after summons to oral proceedings against EP3656259, dated Sep. 26, 2024, European Patent Application No. 20151759.6 (38 pgs.).
Written submission in preparation to/during oral proceedings against EP3656259, dated Sep. 27, 2024, European Patent Application No. 20151759.6 (3 pgs.).
Opposition to Euorpean Patent No. EP3656259, dated Sep. 26, 2024, European Patent Application No. 20151759.6 (36 pgs.).
Written submission in preparation to/during oral proceedings against EP3656259, dated Sep. 30, 2024, European Patent Application No. 20151759.6 (100 pgs.).
Response to the Statement of Grounds filed on Sep. 19, 2023 by opponent 2: Societe des Produits Nestle S.A. against the Decision of May 19, 2023, dated Jan. 26, 2024, European Patent Application No. 14730191.5 (105 pgs.).
European Communication pursuant to Article 101(1) and Rule 81(2) to (3) EPC, dated Feb. 29, 2024, European Patent Application No. 14730192.3 (4 pgs.).
Written submissions in opposition procedure against EP2996521, dated Aug. 22, 2024, European Patent Application No. 14730192.3 (6 pgs.).
Response to Communication pursuant to Article 101(1) and Rule 81(2) to (3) EPC, dated Jul. 1, 2024, European Patent Application No. 14730192.3 (53 pgs.).
European Brief Communication Opposition Proceedings, dated May 6, 2024, European Application No. 20151759.6 (31 pgs.).
Response to Notices of Opposition, dated Jan. 3, 2024, European Application No. 20151759.6 (214 pgs.).
EPO Communication of further notices of opposition, dated Aug. 24, 2023, European Application No./Patent No. 20151759.6 / 3656259 (128 pgs).
EPO Communication of further notices of opposition, dated Aug. 24, 2023, European Application No./Patent No. 20151759.6 / 3656259 (105 pgs).
EPO Communication of further notices of opposition, dated Aug. 24, 2023, European Application No./Patent No. 20151759.6 / 3656259 (134 pgs).
EPO Communication of notices of opposition, dated Aug. 24, 2023, European Application No./ Patent No. 20151759.6 / 3656259 (5 pgs).
EPO Brief Communication, dated Aug. 24, 2023, European Application No./Patent No. 20151759.6 / 3656259 (4 pgs).
EPO Communication of Decision of the Board of Appeal of Oct. 17, 2023, dated Nov. 30, 2023, European Application No./Patent No. 14730192.3 / 2996521 (31 pgs).
EPO Communication of Minutes of the oral proceedings of Oct. 17, 2023, dated Oct. 27, 2023, European Application No./Patent No. 14730192.3 / 2996521 (8 pgs).
Information about the result of oral proceedings in Opposition Proceedings Against European Patent No. EP36556259, dated Nov. 27, 2024, European Patent Application No. 20151759.6 (1 pg.).
Brief Communication in Opposition Proceedings Against European Patent No. EP36556259, dated Nov. 14, 2024, European Patent Application No. 20151759.6 (1 pg.).
Brief Communication in Opposition Proceedings Against European Patent No. EP2996521, dated Sep. 9, 2024, European Patent Application No. 14730192.3 (5 pgs.).
Amendment by Patent Owner in Opposition Proceedings against European Patent No. EP2996521, dated Dec. 23, 2024, European Patent Application No. 14730192.3 (35 pgs.).
Response to Patent Owner's Submission in Opposition Proceeding Against European Patent No. EP2996966, dated Nov. 7, 2024, European Application No. 14730191.5 (40 pgs.).
Summons to Oral Proceedings in Opposition Proceeding Against European Patent No. EP2996966, dated Dec. 18, 2024, European Application No. 14730191.5 (40 pgs.).
Brief Communication from Opponent 3, Delica AG in Opposition to European Patent No. EP2996521, dated Jan. 14, 2025, European Patent Application No. 14730192.3, with English translation (4 pgs.).
Response to the communication of Sep. 9, 2024, in Opposition to European Patent No. EP2996521, dated Jan. 13, 2025, European Patent Application No. 14730192.3, (3 pgs.).
Reply to an examination in communication in opposition proceedings of European Patent No. EP2996521, dated Jan. 8, 2025, European Patent Application No. 14730192.3, with English translation (8 pgs.).
Notice of Submission on Feb. 7, 2025 by Opposing Party in Opposition to European Patent No. EP3375333, dated Feb. 14, 2025, European Patent Application No. 18169985.1, (12 pg.).
Notice of Withdrawal by Opponent on Feb. 18, 2025 from the Opposition to European Patent No. EP3375333, dated Mar. 3, 2025, European Patent Application No. 18169985.1, (2 pgs.).
Notice of Withdrawal by Opponent on Feb. 18, 2025 from the Opposition to European Patent No. EP2996521, dated Mar. 3, 2025, European Patent Application No. 14730192.3, (2 pgs.).
Minutes of Oral Proceedings in Opposition to European Patent No. EP3656259, dated Jan. 27, 2025, European Patent Application No. 20151759.6, (36 pgs.).
EPO Decision to Revoke European Patent No. EP3656259, dated Jan. 27, 2025, European Patent Application No. 20151759.6, (28 pgs.).
Summons to attend Oral Proceedings Facts Submission in Opposition to European Patent No. EP3375333, dated Feb. 2, 2025, European Patent Application No. 18169985.1, (30 pgs.).
Confirmation of Withdrawal of the Opposition by the respondend and former opponent in Opposition to European Patent No. EP2996966, dated Apr. 8, 2025, European Patent Application No. 14730191.5, (1 pg.).
Notice of Withdrawal on Feb. 18, 2025 by Opponent from Opposition to European Patent No. EP3656259, dated Mar. 3, 2025, European Patent Application No. 20151759.6, (2 pg.).
EPO Notice of Appeal, dated Apr. 1, 2025, European Patent Application No. 20151759.6 / European Patent No. EP3656259 (2 pgs.).
Notice of Withdrawal of the Opposition by the respondent and former opponent in Opposition to European Patent No. EP3656259, dated Apr. 8, 2025, European Patent Application No. 20151759.6, (1 pg.).
Notice of Withdrawal by Opponent on April 3 from the Opposition to European Patent No. EP3375333, dated Apr. 11, 2025, European Patent Application No. 18169985.1, (3 pgs.).
Notice of Withdrawal by Opponent on April 3 from the Opposition to European Patent No. EP2996521, dated Apr. 11, 2025, European Patent Application No. 14730192.3, (2 pgs.).

BEVERAGE PREPARATION SYSTEM, A CAPSULE AND A METHOD FOR FORMING A BEVERAGE

CROSS-REFERENCE TO RELATED APPLICATIONS

This application is a continuation of U.S. patent application Ser. No. 14/786,142, filed Oct. 21, 2015, which is a U.S. national phase application of International Application No. PCT/IB2014/000858, filed May 16, 2014, which claims the benefit of Great Britian Application No. 1308925.5, filed May 17, 2013 and Great Britian Application No. 1308929.7, filed May 17, 2013, which are all hereby incorporated herein by their reference in their entirety.

FIELD

The present disclosure relates to a beverage preparation system, a capsule and a method for forming a beverage. The beverage preparation system is of the type comprising a beverage preparation machine wherein the capsule is designed for insertion into the beverage preparation machine to permit a pressurised liquid to be flowed through the capsule in order to produce a beverage from interaction with beverage ingredients contained within the capsule.

BACKGROUND

Beverage preparation systems which comprise a beverage preparation machine and a capsule containing beverage ingredients are known in the art. One such system is taught in EP 1700548, which discloses a capsule comprising a cup-like base body and a closing foil member. The capsule is designed for insertion in a beverage production device in which a liquid under pressure enters the capsule in order to interact with ingredients in the capsule to form a beverage which is output for consumption. The capsule of EP 1700548 is provided with a dedicated sealing member to prevent a by-pass flow of water around the exterior of the capsule in use. The sealing member is in the form of a hollow sealing member on the outer surface of the capsule, for example in the form of a step which is contacted on closure of an enclosing member of the beverage preparation machine.

The present disclosure provides an alternative capsule which may be used as part of such a beverage preparation system. The capsule may be economical to produce and provide effective sealing in use.

SUMMARY OF THE DISCLOSURE

In a first aspect the present disclosure provides a beverage producing system comprising:
a capsule containing beverage ingredients; and
a beverage preparation machine;
the capsule comprising a cup-shaped body and a lid; the cup-shaped body having a base and a side wall and the lid being sealed to the cup-shaped body;
the capsule being designed for insertion into the beverage preparation machine to permit a pressurised liquid to be flowed through the capsule in order to produce a beverage from interaction with the beverage ingredients;
the beverage preparation machine having an enclosing member adapted to be selectively movable between an open position to permit insertion of the capsule into the beverage preparation machine and a closed position in which the enclosing member sealingly engages the capsule;
wherein, prior to insertion, the side wall comprises:
an annular trough being dimensioned to receive the enclosing member on movement of the enclosing member into the closed position;
a first side wall section extending between the base and the annular trough; and
a second side wall section extending between the annular trough and a rim of the capsule.

In a second aspect, the present disclosure provides a capsule for preparing a beverage comprising a cup-shaped body and a lid; the cup-shaped body having a base and a side wall and the lid being sealed to the cup-shaped body;
the capsule being designed for insertion into a beverage preparation machine to permit a pressurised liquid to be flowed through the capsule in order to produce a beverage from interaction with the beverage ingredients;
the beverage preparation machine being of the type having an enclosing member adapted to be selectively movable between an open position to permit insertion of the capsule into the beverage preparation machine and a closed position in which the enclosing member sealingly engages the capsule;
wherein the side wall comprises:
an annular trough being dimensioned to receive the enclosing member;
a first side wall section extending between the base and the annular trough; and
a second side wall section extending between the annular trough and a rim of the capsule.

In a third aspect the present disclosure provides a method for preparing a beverage comprising the steps of:
providing a capsule as described above;
providing a beverage preparation machine having an enclosing member;
moving the enclosing member into an open position;
inserting the capsule into the beverage preparation machine;
closing the enclosing member so as to sealingly engage the enclosing member with the capsule;
flowing a pressurised liquid through the capsule to produce a beverage from interaction with the beverage ingredients; and
outputting the beverage for consumption;
wherein on closure, the enclosing member engages the annular trough of the side wall of the capsule to thereby deform the side wall;
wherein said deformation of the side wall causes the formation of at least one sealing interface between the enclosing member and the side wall.

The above aspects may further comprise one or more of the following features:

The annular trough may be dimensioned to partially or wholly receive a leading edge of the enclosing member therein on movement of the enclosing member into the closed position.

The second side wall section may define a ridge zone located radially outwards of the annular trough.

The side wall may be adapted to undergo plastic deformation during closure of the enclosing member.

The side wall may be adapted such that, in use, closure of the enclosing member deforms the side wall to cause the second side wall section to be forced inwardly against an outer face of the enclosing member to form a sealing interface with the outer face of the enclosing member.

The annular trough may be adapted to form a sealing interface with a leading edge of the enclosing member.

Advantageously, a sealing interface may be provided with both the leading edge and the outer face of the enclosing member. In addition, the deformation of the annular trough may also cause an outward pressure to be exerted by the side wall on the inner face of the enclosing member to form a further sealing interface.

The side wall may be adapted such that during closure of the enclosing member the side wall is plastically drawn over the leading edge of the enclosing member. Advantageously this may allow the side wall to be conformed to the shape of any grooves (or similar) provided in the leading edge.

Prior to insertion, the annular trough may comprise an inner wall, an outer wall and a floor. On closure of the enclosing member a leading edge of the enclosing member may contact the outer wall of the annular trough and form a seal therewith.

The inner wall and outer wall may be substantially perpendicular to the floor. In an alternative arrangement the outer wall may be angled relative to the floor, such that an internal angle at a junction between the floor and the outer wall is from 90° to 120°, preferably 105°. Thus the seal with the enclosing member may be a tapered seal.

The ridge zone may comprise an apex, and a leading edge of the enclosing member may comprise an inner rim and an outer rim and a recess located between the inner rim and the outer rim, wherein on closure of the enclosing member the apex of the ridge zone may be received in the recess between the inner rim and the outer rim.

The annular trough may be adapted to be nipped against a capsule holder of the beverage preparation machine part.

Prior to insertion, a floor of the annular trough may be raised relative to the rim. The floor of the annular trough may be offset from a distal end of the side wall by a distance from 0.1 to 2.0 mm. In one example, the offset may be relatively large, for example it may be from 1.55 to 2.0 mm. In a specific example the offset may be 1.85 mm. Where the offset is relatively large, the floor of the annular trough may be from 0.75 to 1.2 mm below an apex of the ridge zone (where present). In one example, the distance may be 0.9 mm. In another example, prior to insertion, the floor of the annular trough may be substantially level with the rim. For example the offset may be 0.1 to 0.5 mm. In one example the offset may be 0.2 mm. In this alternative arrangement the floor of the annular trough may be from 2.0 to 2.5 mm below an apex of the ridge zone (where present). In one example, the distance is 2.2 mm.

The side wall may be adapted such that, in use, closure of the enclosing member deforms the side wall to cause the floor of the annular trough to be brought substantially into alignment with the rim.

The first side wall section, annular trough and second side wall section may be formed integrally.

The rim may be formed integrally with the cup-shaped body.

The rim may be formed by a rolled-over portion of the side wall.

Prior to insertion, the side wall may comprise a frustoconical section proximate the base.

Prior to insertion, the side wall may comprise a cylindrical section between the frustoconical section and the annular trough.

The annular trough may have an internal width of from 1.3 to 2.0 mm. In one example, the annular trough has an internal width of approximately 1.5 mm to 1.8 mm.

The annular trough may have an internal diameter of from 27.5 to 30.0 mm and an outer diameter of from 29.3 to 32.5 mm.

The lid may be sealed to the annular trough of the side wall. The lid may be sealed to an inner surface of a floor of the annular trough.

A leading edge of the enclosing member may comprise a plurality of grooves or indentations, and the side wall may be adapted such that the plastic deformation of the side wall conforms the annular trough of the side wall to the grooves or indentations to provide an effective seal. In one arrangement the plastic deformation of the side wall conforms the outer wall of the annular trough to the grooves or indentations to provide an effective seal.

At least a portion of the cup-shaped body, preferably a whole of the cup-shaped body, may be formed from aluminium, an aluminium alloy or a laminate comprising at least one layer formed from aluminium or an aluminium alloy. A lacquer layer may be applied to one or both faces of the cup-shaped body. Alternatively, another, suitably ductile material could be utilised in place of the aluminium or aluminium alloy.

The aluminium alloy may, for example, be of grade 3005, 3105, 8011 or 8079. Preferably, the aluminium alloy will have an 'O' temper rating.

The laminate, where used, may comprise a ductile structural layer formed from a material such as aluminium or an aluminium alloy together with a resilient layer formed from a polymer. The laminate may comprise only a single layer of aluminium or aluminium alloy together with a single layer of polymer together with one or more optional lacquer layers, tie layers or adhesive layers applied to the aluminium or aluminium alloy.

The cup-shaped body may comprise a unitary piece of laminate material.

The polymer layer may, for example, comprise a material selected from the group of: polyvinyl chloride (PVC), polypropylene (PP), low density polyethylene (LDPE), medium density polyethylene (MDPE), high density polyethylene (HDPE), fluorinated ethylene propylene (FEP), polytetrafluoroethylene (PTFE), polyethylene terephthalate (PET), polyamide (PA), ethylene propylene diene monomer (EPDM), polychloroprene or isobutylene.

The polymer of the polymer layer preferably has a hardness of less than or equal to 40 D Shore Hardness. Advantageously, using a relatively soft polymer for the outer layer of the laminate allows the material to deform around imperfections and features of the enclosing member to provide a more effective hydraulic seal.

The lid may be formed from aluminium, an aluminium alloy or a laminate comprising at least one layer formed from aluminium or an aluminium alloy. Alternatively, another, suitably ductile material could be utilised. The lid may further comprise a heat seal lacquer or heat seal layer to enhance sealing of the lid to the cup-shaped body.

The cup-shaped body may be formed from a single integral piece of material. The single piece of material may be cold drawn to form the shape of the cup-shaped body, including the annular trough. A deep-drawing technique may be used to cold form the cup-shaped body. Where the material of the cup-shaped body comprises a laminate with a polymer layer, a warm-drawing technique may be used where the material is subjected to an increased temperature to promote easier deformation of the polymer material but without detrimental effects on the material characteristics of the aluminium layer.

The cup-shaped body and rim may be integral.

The cup-shaped body may have a thickness in the range of 80 to 500 microns. In some aspects the thickness may be in the range of 90 to 300 microns. Where the cup-shaped body is formed solely from aluminium or an aluminium alloy (optionally with one or more lacquer layers) a thickness in the range of 80 to 120 microns may be preferred. Where the cup-shaped body is formed from a laminate material comprising a polymer layer a thickness in the range 100 to 500 microns is preferred. The thickness of the material may be varied throughout the cup-shaped body.

The rim may have an outer diameter of approximately 37 mm.

Prior to insertion, the capsule may have a height of from 25 to 31 mm. In some aspects the height may be from 28.5 to 30 mm. Deformation of the capsule during use will tend to reduce the longitudinal height.

Preferably, the cup-shaped bodies may be shaped in a way that can be stacked and destacked easily prior to filling and assembly with the lids.

The capsule may form a single-use, disposable element.

The capsule may contain a beverage ingredient or mixture of beverage ingredients. As a non-limiting example, the beverage ingredient may comprise roasted ground coffee.

BRIEF DESCRIPTION OF THE DRAWINGS

Examples of the present disclosure will now be described in more detail, for exemplary purposes only, with reference to the accompanying drawings, in which.

DETAILED DESCRIPTION

Figure 3:
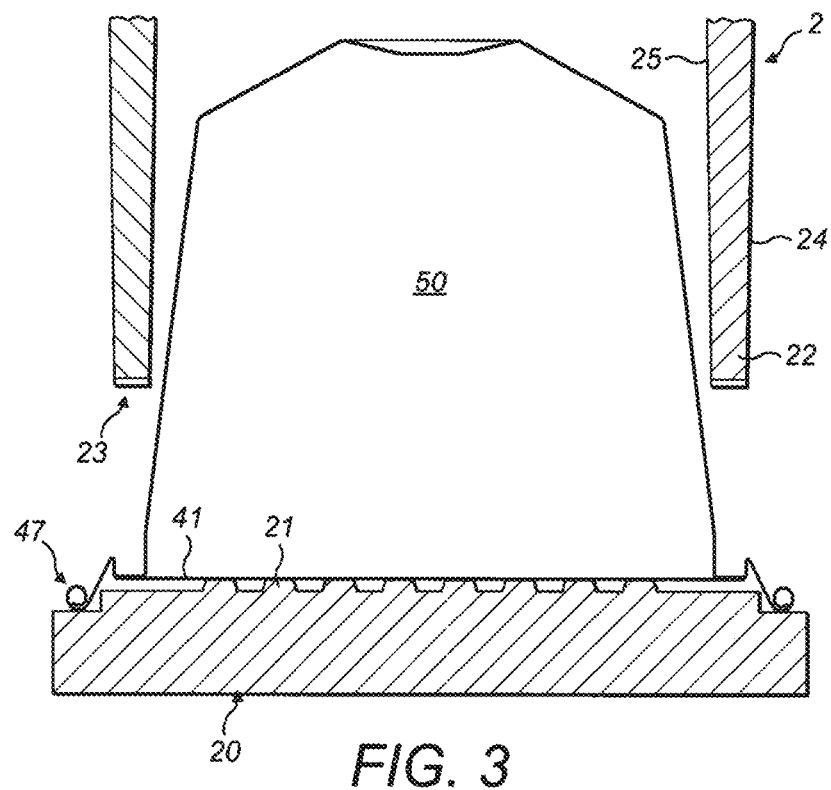
FIG. 3 is a schematic illustration of the capsule of FIG. 1 together with an enclosing member of a beverage preparation machine.
Figure 4:
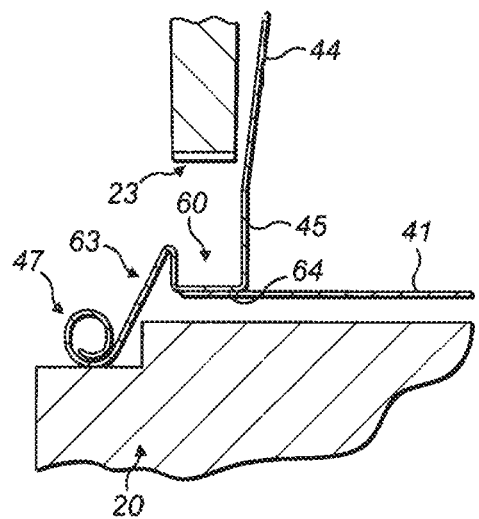
FIG. 4 is an enlarged view of a detail of FIG. 3.

FIG. 3 shows schematically a part of a beverage preparation system according to the present disclosure. The beverage preparation system comprises a beverage preparation machine and a capsule 1.

Figure 1:
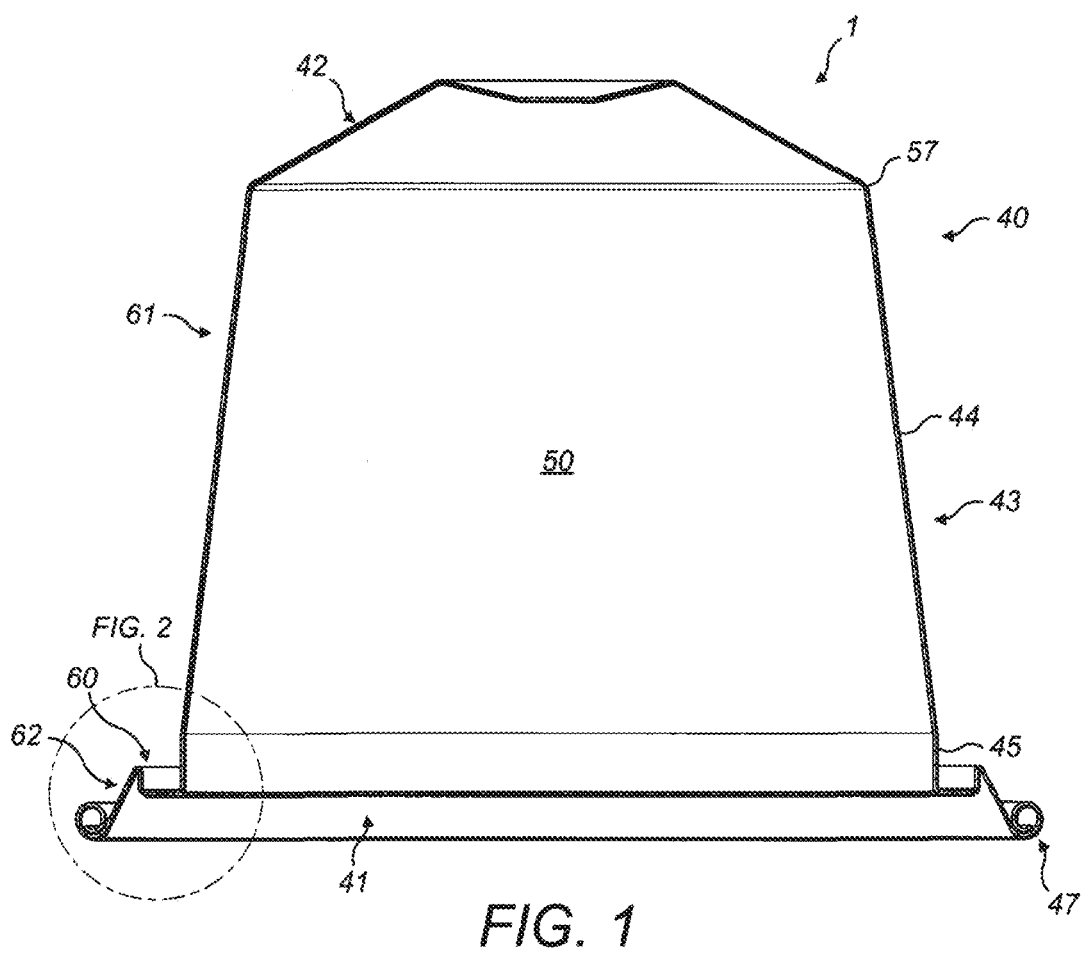
FIG. 1 is a cross-sectional view of a first embodiment of capsule according to the present disclosure.
Figure 2:
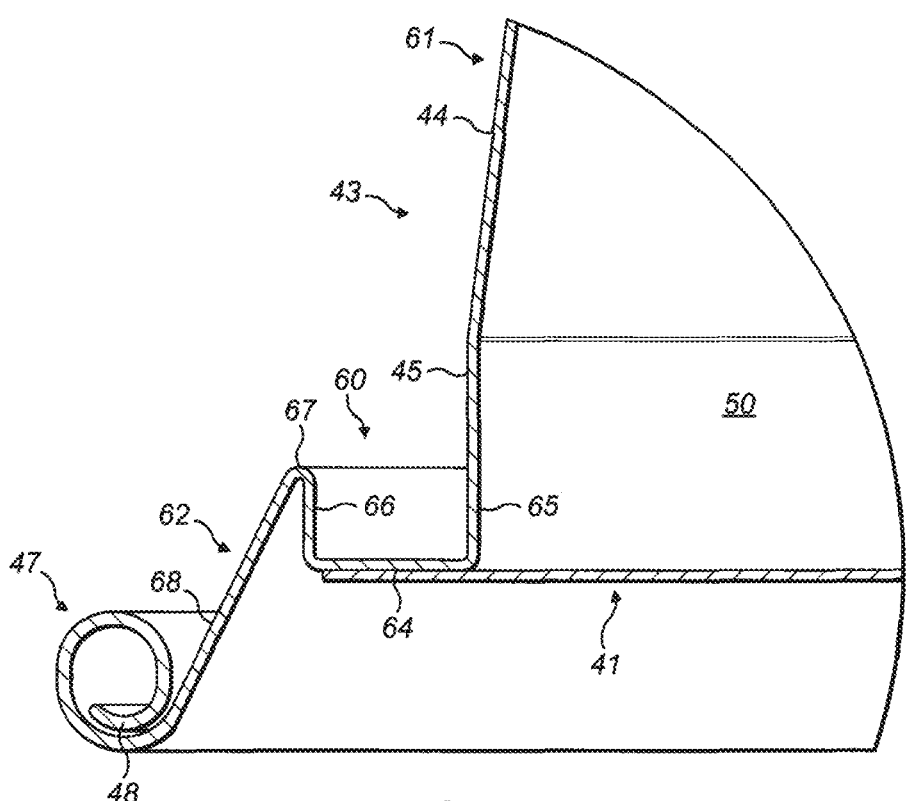
FIG. 2 is an enlarged view of a detail of FIG. 1.

FIGS. 1 and 2 show a first embodiment of capsule 1. The capsule 1 will be described in more detail below but may have the general form of a cup-shaped body 40 having a base 42 at one end and a side wall 43 extending from the base 42 towards an opposed end which is closed-off by a lid 41.

As shown in FIG. 3, the beverage preparation machine comprises an enclosing member 2 and a capsule holder 20. The enclosing member 2 is selectively movable relative to a capsule holder 20 between an open position, to permit insertion of the capsule 1 into the beverage preparation machine, and a closed position, in which the enclosing member 2 sealingly engages the capsule 1 against the capsule holder 20 in a manner that will be described below.

The enclosing member 2 may be moved between the open and closed positions by means of a conventional mechanism well known in the art. For example, the means may involve a mechanical mechanism activated by a manually-movable lever or an automatic or semi-automatic mechanism where movement is driven by a motor. The enclosing member 2 may be moved while the capsule holder 20 remains stationary. Alternatively, the enclosing member 2 may remain stationary and the capsule holder 20 be moved. In a further alternative arrangement, both the enclosing member 2 and the capsule holder 20 may move during the opening and closing operations.

The enclosing member 2 and the capsule holder 20 in the closed position together define a receptacle 3 for holding the capsule 1 during a dispensing operation.

The beverage preparation machine may further comprise other conventional elements which are not illustrated in the accompanying drawings and are well known in the art of beverage preparation machines. For example, the beverage preparation machine may comprise either a facility for storing an aqueous medium, such as an internal reservoir, or a facility for connection to an external supply of aqueous medium, such as mains water. The aqueous medium will typically be water. A pump or equivalent may be provided for supplying the aqueous medium in a pressurised state to the capsule 1. The aqueous medium will typically be supplied at a pressure of up to 9 to 14 bar. A heater may be provided for heating the aqueous medium to a desired temperature. The heater may heat the aqueous medium in the reservoir (where present) or may heat the aqueous medium on-demand as it passes through a conduit or over a thermoblock to the receptacle 3. The beverage preparation machine may comprise base piercing means for piercing the base 42 of the capsule 1 to permit the aqueous medium to enter the capsule 1 and interact with the beverage ingredients therein. Alternatively, the capsule 1 may be provided with one or more pre-formed openings to allow entry of the aqueous medium from the receptacle 3 into the capsule 1.

The enclosing member 2 may be of the type described in EP 1700548 comprising an annular element 22 having a leading edge 23 in the form of an annular rim, an inner face 25 facing the receptacle 3 and an outer face 24 facing an exterior. The leading edge 23 may be provided with a plurality of grooves as taught in EP 1700548. An upper end (not shown) of the enclosing member 2 may be coupled to a supply of the aqueous medium and may provide a mounting for one or more perforation elements intended to pierce the base 42 of the capsule 1 in use.

The capsule holder 20 may be of the type described in EP 1700548 comprising relief elements 21 which are designed to tear and perforate the lid 41 of the capsule 1. The tearing of the lid 41 may occur due to internal pressurisation of the capsule 1 caused by inflowing aqueous medium. The relief elements 21 may have any protruding shape able to cause a partial tearing of the foil member, e.g. pyramids, needles, bumps, cylinders, or elongated ribs.

As shown in FIG. 1, the cup-shaped body 40 and the lid 41 of the capsule 1 together enclose a beverage ingredient chamber 50 which may be filled with a beverage ingredient or mixture of beverage ingredients. As a non-limiting example, the beverage ingredient may comprise roasted ground coffee.

In the illustrated example, the cup-shaped body 40 is made from aluminium or an aluminium alloy. However, other materials may be utilised, such as a laminate of aluminium or aluminium alloy and a polymer. The cup-shaped body 40 includes the base 42 and the side wall 43. There may be, as illustrated, a geometric discontinuity at the junction between the base 42 and the side wall 43, for example, in the form of a shoulder 57. Alternatively, the base 42 and the side wall 43 may have a smooth geometric transition.

The cup-shaped body 40 may have a thickness in the range of 80 to 500 microns. The thickness of the material may be varied throughout the cup-shaped body 40. In the illustrated example the thickness is 100 microns.

The side wall 43 is provided with an annular trough 60 which is dimensioned to receive, partially or wholly, the leading edge 23 of the enclosing member 2 on movement of the enclosing member 2 into the closed position. A first side wall section 61 is provided extending between the base 42 and the annular trough 60 and a second side wall section 62 is provided extending between the annular trough 60 and a distal end of the side wall 43 of the capsule 1.

The annular trough 60 may be defined by an inner wall 65, an outer wall 66 and a floor 64 which extends there between. The inner wall 65 and outer wall 66 may, prior to insertion of the capsule 1 in the beverage preparation machine, extend perpendicularly to the floor 64. The inner wall 65 may be formed by a portion of the first side wall section 61.

A ridge zone 63 is located radially outwards of the annular trough 60. The ridge zone 63 may comprise an annular projection which extends back in the general direction of the base 42 such that an apex 67 of the ridge zone 63 is raised above the level of the floor 64 of the annular trough 60. The apex 67 may be raised above the floor 64 by a distance from 0.75 to 2.5 mm. As illustrated in this embodiment, the distance is 0.9 mm. The ridge zone 63 may be formed to have an inner wall provided by the outer wall 66 of the annular trough 60 and an outer wall 68 formed by at least a portion of the second side wall section 62.

The side wall 43, including the annular trough 60 and the ridge zone 63 may be formed integrally. Further, the cup-shaped body 40 including the side wall 43 and the base 42 may be formed integrally.

The annular trough 60 may have an internal width of from 1.3 to 2.0 mm. Typically, the internal width of the annular trough 60 is chosen to be marginally greater than the breadth of the leading edge 23 of the annular element 22. In one example, the annular trough 60 has an internal width of approximately 1.5 mm to 1.8 mm.

The annular trough 60 may have an internal diameter of from 27.5 to 30.0 mm (that is the diameter of the surface of the inner wall 65 facing into the annular trough 60) and an outer diameter of from 29.3 to 32.5 mm (that is the diameter of the surface of the outer wall 66 facing into the annular trough 60). Optionally, the internal diameter may be chosen so there is a slight interference fit between the inner wall 65 and the outer face 24 of the enclosing member 2 on closure. This helps to ensure good alignment of the annular trough 60 with the enclosing member 2.

As illustrated, the lid 41 is sealed to the annular trough 60. In particular, the lid 41 is sealed to an inner surface of the floor 64 of the annular trough 60. The floor 64 of the annular trough 60 is raised relative to a distal end of the side wall 43. Consequently, the lid 41 is also raised relative to the distal end of the side wall 43. The floor 64 may be offset from the distal end of the side wall 43 by a distance from 0.1 to 2.0 mm as described previously. As illustrated, the offset is 1.85 mm. Sealing the lid 41 to the floor 64 helps to ensure that the enclosing member 2 does not bear down on a hollow part of the capsule 1 so as to trap beverage ingredients in between the leading edge 23 and the capsule holder 20 which could have a detrimental effect on the fluid-tightness of the seal.

The lid 41 may be formed from aluminium, an aluminium alloy or a laminate containing aluminium.

The first side wall section 61 may comprise a frustoconical section 44 proximate the base 42 and a cylindrical section 45 distal the base 42, wherein a portion of the cylindrical section 45 forms the inner wall 65 of the annular trough 60.

The capsule 1 may be provided with a rim 47 formed at an end of the cup-shaped body 40 remote from the base 42, i.e. at the distal end of the side wall 43. The rim 47 may be formed integrally with the cup-shaped body 40. In the illustrated example, the rim 47 is formed by a rolled-over portion 48 of the side wall 43.

In use of the beverage preparation system the enclosing member 2 is first moved into the open position and the capsule 1 is inserted into a location in between the capsule holder 20 and the enclosing member 2. Depending on the design of the beverage preparation machine, the capsule 1 may be inserted by gravity or by manual placement or a combination thereof. In addition, the initial insertion may place the capsule 1 in proximity to the enclosing member 2 such that subsequent movement of the enclosing member 2 carries the capsule 1 therewith into engagement with the capsule holder 20. Alternatively, initial insertion may place the capsule 1 in proximity to the capsule holder 20 such that the capsule 1 remains substantially stationary during closure of the enclosing member 2.

The enclosing member 2 is then closed so as to sealingly engage the enclosing member 2 with the capsule 1. During this step the base 42 of the capsule 1 may be pierced by the perforation elements of the enclosing member 2.

Pressurised aqueous medium (which may be heated, at ambient temperature or chilled) is then flowed into the capsule 1 to produce a beverage from interaction with the beverage ingredients. During this step internal pressurisation of the beverage ingredient chamber 50 causes the lid 41 to be deformed outwardly against the relief elements 21 of the capsule holder 20 resulting in at least partial tearing of the lid 41 which opens up an exit path from the capsule 1 for the beverage.

The beverage is then output for consumption.

Figure 5:
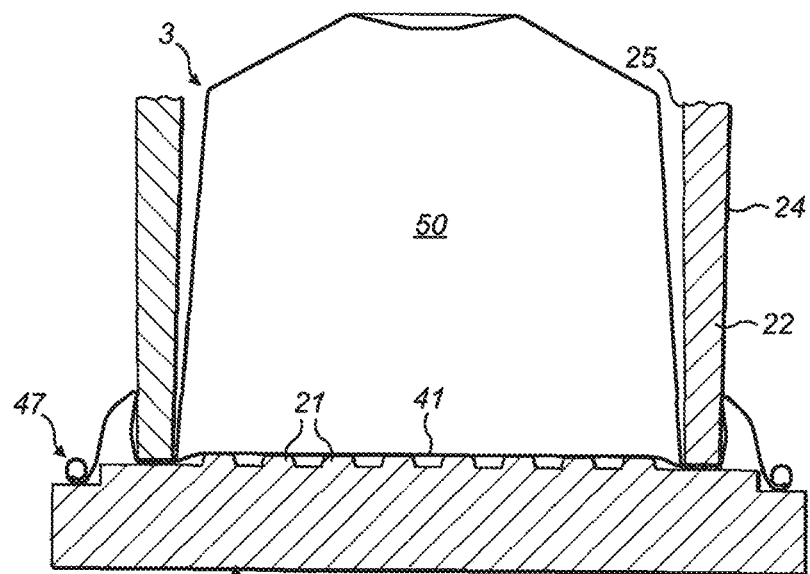
FIG. 5 is a schematic illustration of the arrangement of FIG. 3 with the enclosing member in a closed position.
Figure 6:
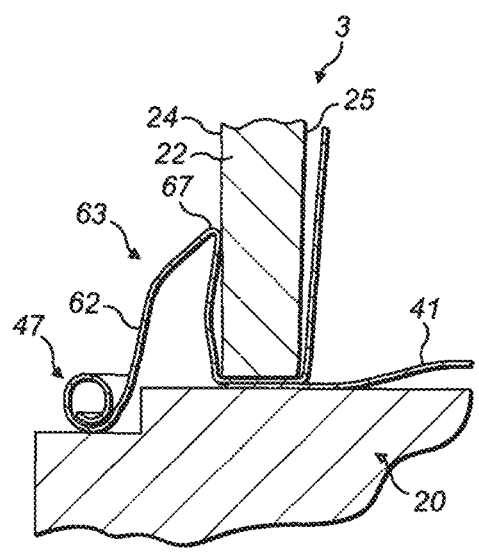
FIG. 6 is an enlarged view of a detail of FIG. 5.
Figure 7:
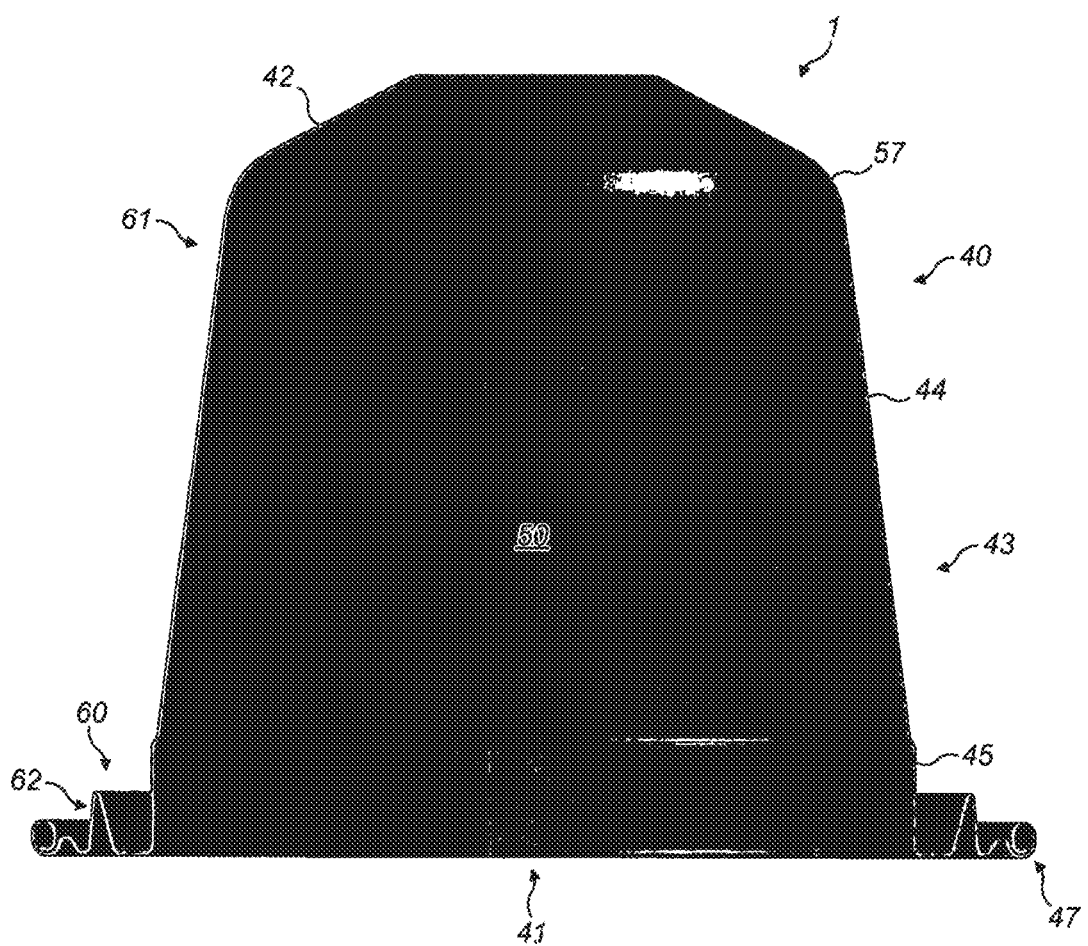
FIG. 7 is a cross-sectional view of a second embodiment of capsule according to the present disclosure.
Figure 8:
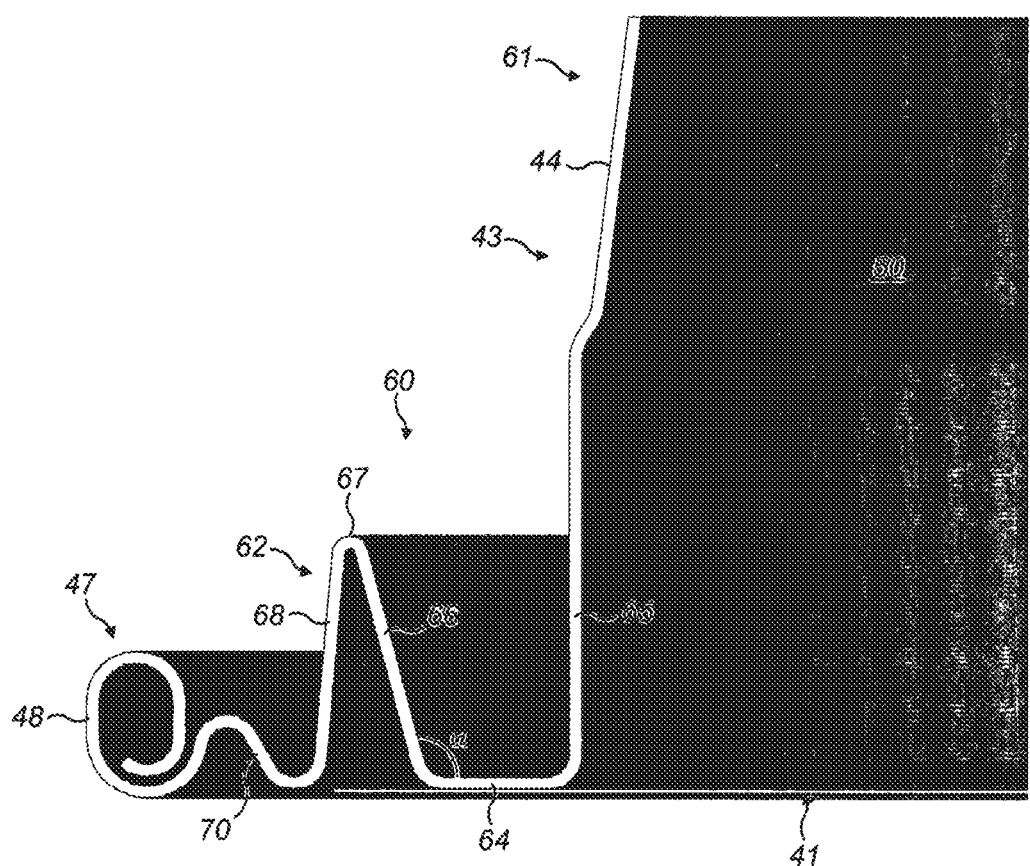
FIG. 8 is an enlarged view of a detail of FIG. 7.

As shown in FIGS. 5 and 6, during the step of closing the enclosing member 2 relative to the capsule holder 20 the side wall 43 of the capsule 1 is contacted by the enclosing member 2 to deform the side wall 43. In particular, the leading edge 23 enters the annular trough 60 and bears on the floor 64 and/or the inner wall 65 and/or the outer wall 66. The floor 64 is driven downwards by the action of the enclosing member 2 to nip the floor 64 (and the lid 41 sealed to the floor 64) against the capsule holder 20. The leading edge 23 may also act to pinch the material of the side wall 43 during this movement which consequently causes the ridge zone 63 to be pivoted inwards to bring the apex 67 of the ridge zone 63 and/or the outer wall 66 of the annular trough 60 into sealing engagement with the outer face 24 of the annular element 22 as shown in FIG. 6. Importantly, the initial point of contact between the leading edge 23 and the floor 64 is axially spaced from the capsule holder 20 such that there is room for the side wall 43 to deform downwards towards the capsule holder 20 enough to allow for inward pivoting of the ridge zone 63 before the side wall 43 is nipped against the capsule holder 20.

The induced movement of the side wall 43 causes the side wall 43 to undergo plastic deformation. In particular, as the side wall 43 is deformed downwards, the side wall 43 (in particular portions of the annular trough 60) may be plastically drawn over the leading edge 23 of the enclosing member 2 which encourages the material of the side wall 43 to be closely conformed to the grooves of the leading edge 23. Thus, the annular trough 60 may form a sealing interface with the leading edge 23 of the enclosing member 2.

Further, deformation of the annular trough 60 may also cause an outward pressure to be exerted by the side wall 43 on the inner face 25 of the enclosing member 2 to form a further sealing interface.

FIGS. 7 to 12 illustrate a second embodiment of capsule 1. Features corresponding to those of the first embodiment are denoted by corresponding reference signs. Features of the first embodiment and this embodiment may be interchanged and combined as desired. In addition, in the following description only differences between the embodiments will be described in detail. In other respects the reader is directed to the description of the prior embodiment.

The cup-shaped body 40 differs from that of the first embodiment in the configuration and geometry of the annular trough 60. As in the first embodiment, the annular trough 60 is dimensioned to receive, partially or wholly, the leading edge 23 of the enclosing member 2 on movement of the enclosing member 2 into the closed position. The inner wall 65 of the annular trough 60, as before, is substantially perpendicular to the floor 64. However, in contrast, the outer wall 66 is angled relative to the floor 64, such that an internal angle α at a junction between the floor 64 and the outer wall 66 is from 90° to 120°, preferably 105°.

The ridge zone 63 is again located radially outwards of the annular trough 60 and comprises an annular projection which extends back in the general direction of the base 42 such that an apex 67 of the ridge zone 63 is raised above the level of the floor 64 of the annular trough 60. The apex 67 may be raised above the floor 64 by a distance from 0.75 to 2.5 mm. As illustrated in this embodiment, the distance is 2.2 mm. The ridge zone 63 may be formed to have an inner wall provided by the angled outer wall 66 of the annular trough 60 and an outer wall 68 formed by at least a portion of the second side wall section 62. As shown most clearly in FIG. 8, the second side wall section 62 may comprise between the outer wall 68 and the rolled-over portion 48 of the rim 47 an additional annular ridge 70 which may provide additional stiffness to the outer portion of the flange. The height of the additional annular ridge 70 may be 0.7 to 0.8 mm.

The side wall 43, including the annular trough 60 and the ridge zone 63 may be formed integrally. Further, the cup-shaped body 40 including the side wall 43 and the base 42 may be formed integrally.

The annular trough 60 may have an internal width of from 1.3 to 2.0 mm. As illustrated, the annular trough 60 has an internal width of approximately 1.5 mm to 1.8 mm.

As illustrated, the lid 41 is sealed to the annular trough 60. In particular, the lid 41 is sealed to an inner surface of the floor 64 of the annular trough 60. The floor 64 of the annular trough 60 is substantially level with a distal end of the side wall 43 prior to insertion. As illustrated the offset from the distal end of the side wall 43 and the lid is only 0.2 mm.

Figure 9:
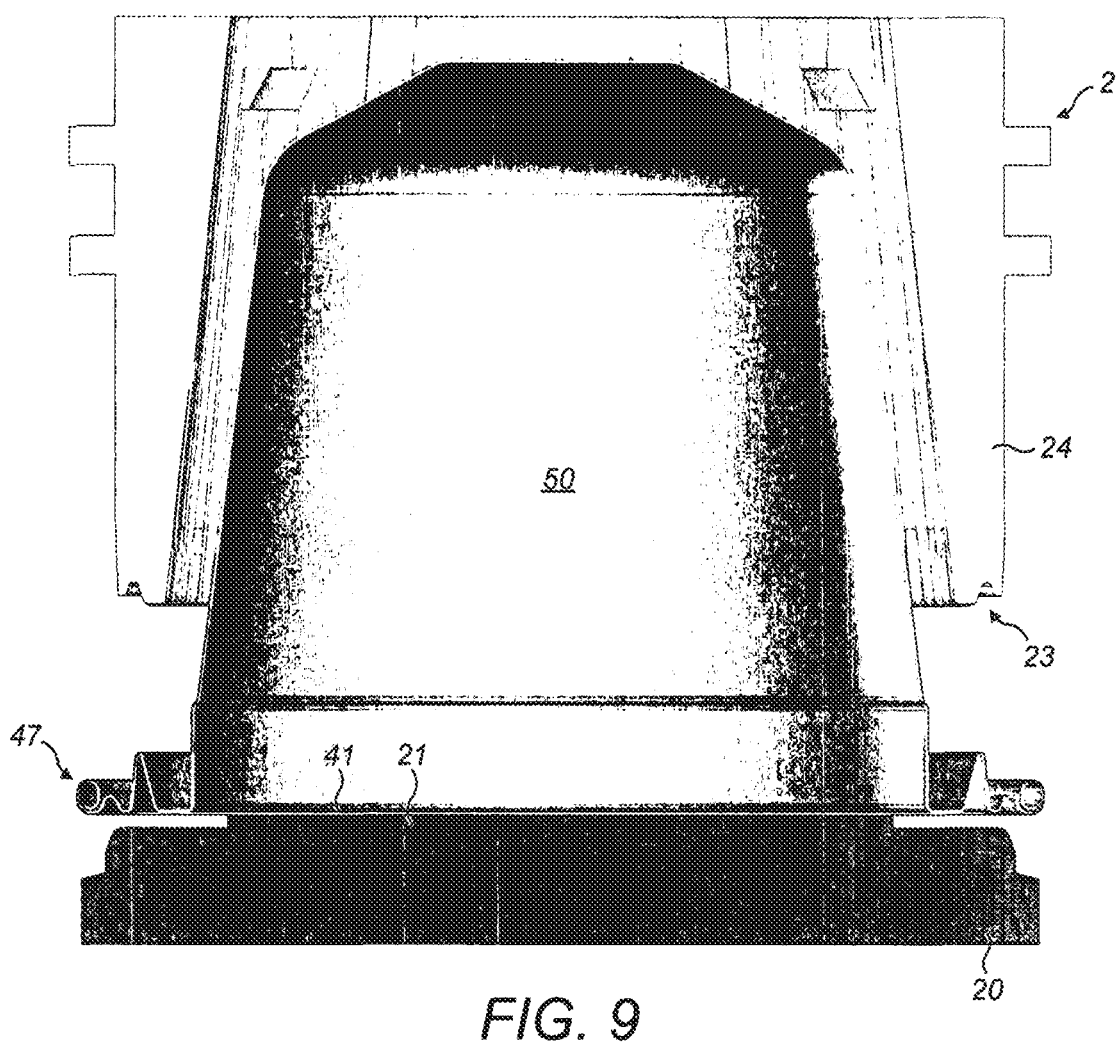
FIG. 9 is a schematic illustration of the capsule of FIG. 7 together with an enclosing member of a beverage preparation machine.
Figure 10:
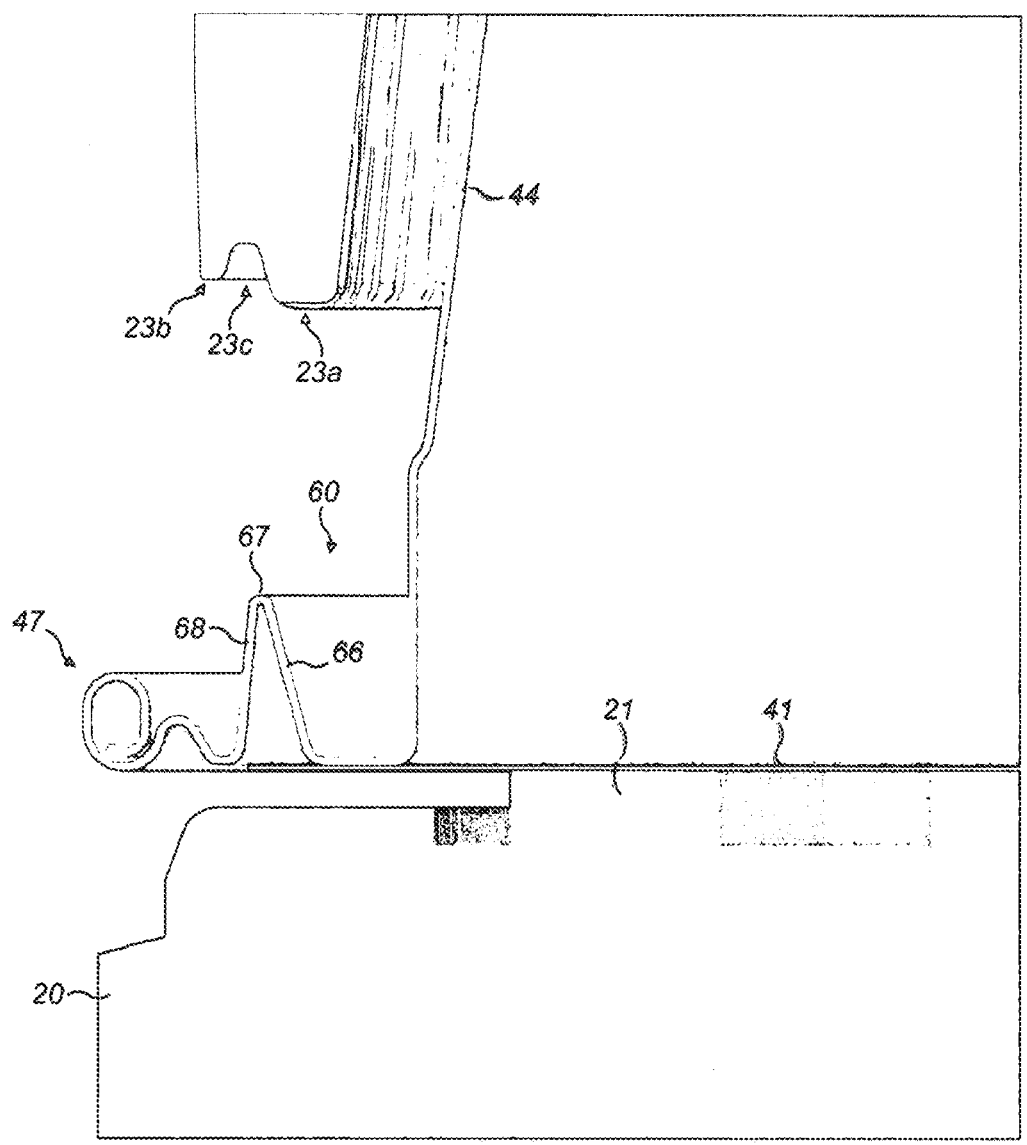
FIG. 10 is an enlarged view of a detail of FIG. 9.

In use of the beverage preparation system, as shown in FIGS. 9 to 12, as before the enclosing member 2 is first moved into the open position and the capsule 1 is inserted into a location in between the capsule holder 20 and the enclosing member 2. FIG. 9 illustrates that the leading edge 23 of the enclosing member 2 may comprise an inner rim 23a and an outer rim 23b which are concentric and spaced apart from one another to define a recess 23c there between, which may be generally annular (although may have interruptions around its circumference).

Figure 11:
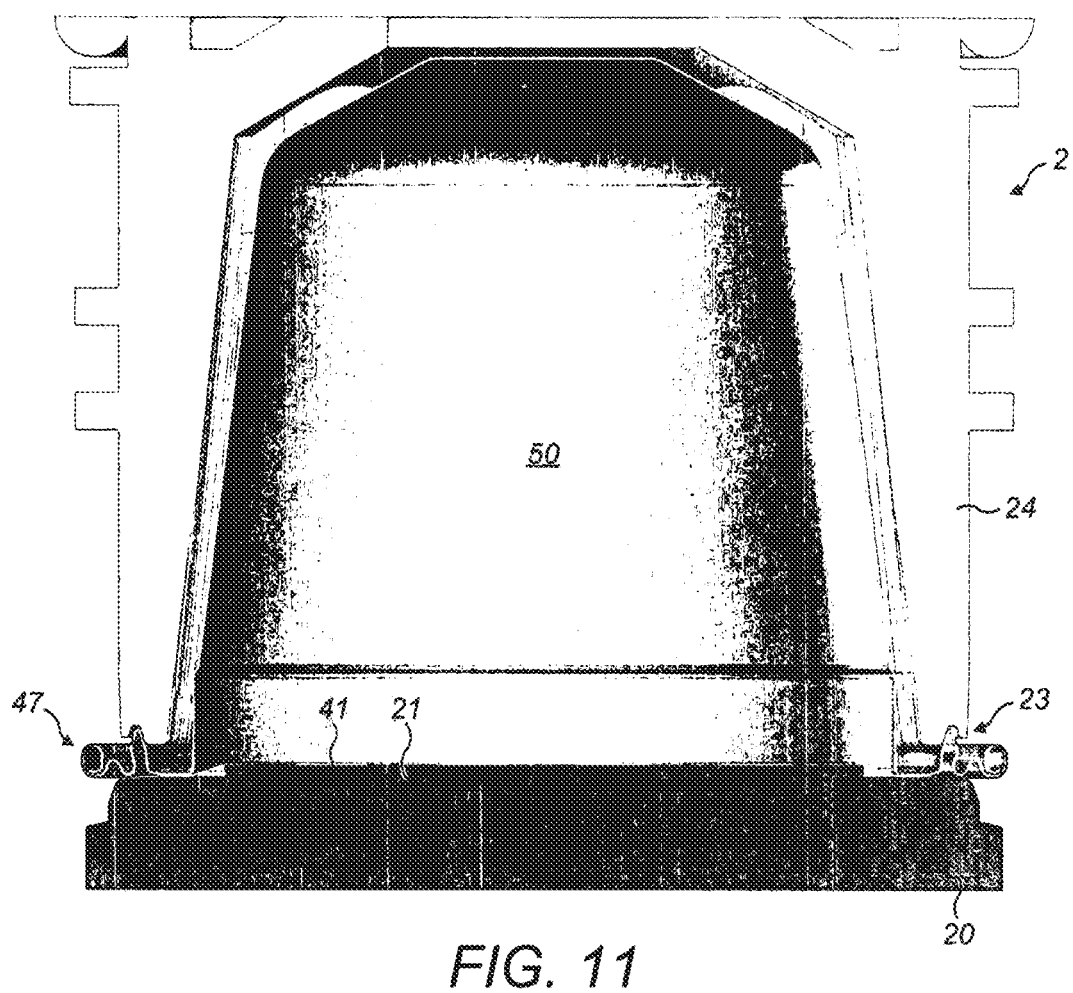
FIG. 11 is a schematic illustration of the arrangement of FIG. 9 with the enclosing member in a closed position.
Figure 12:
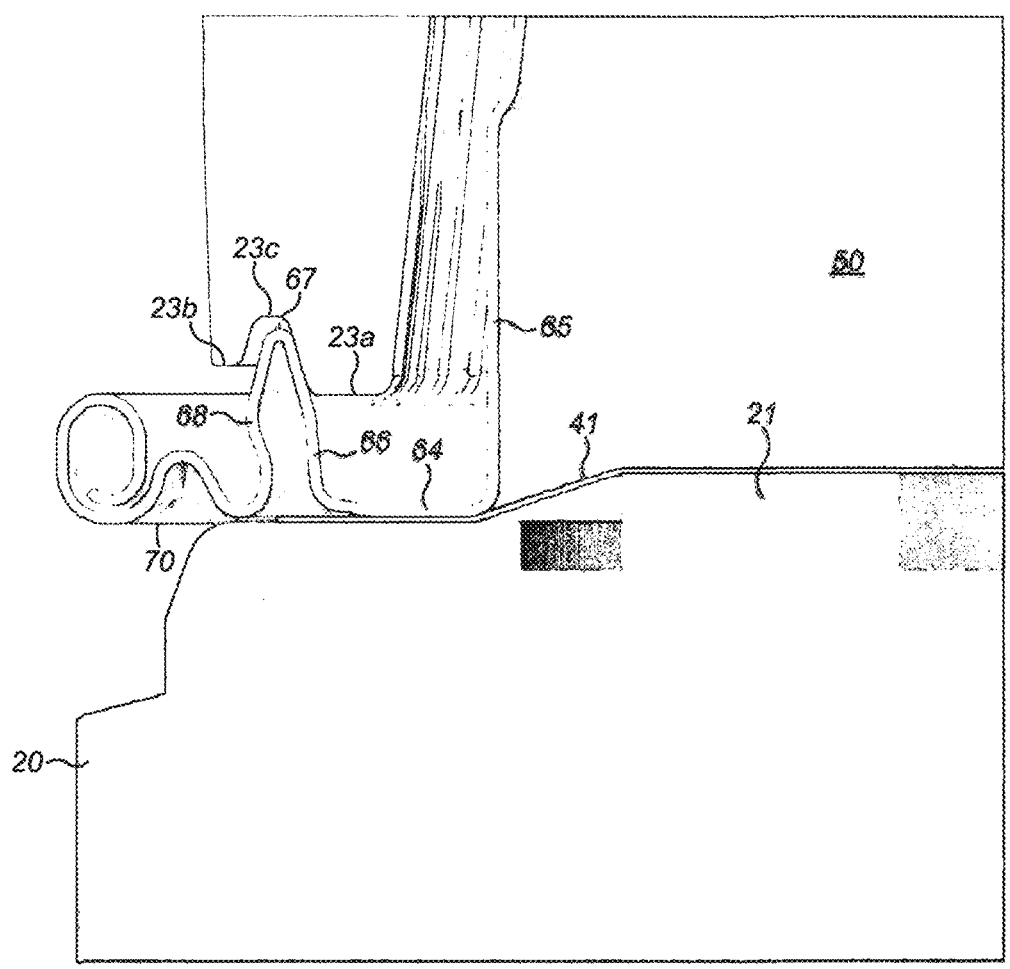
FIG. 12 is an enlarged view of a detail of FIG. 11.
Figure 13:
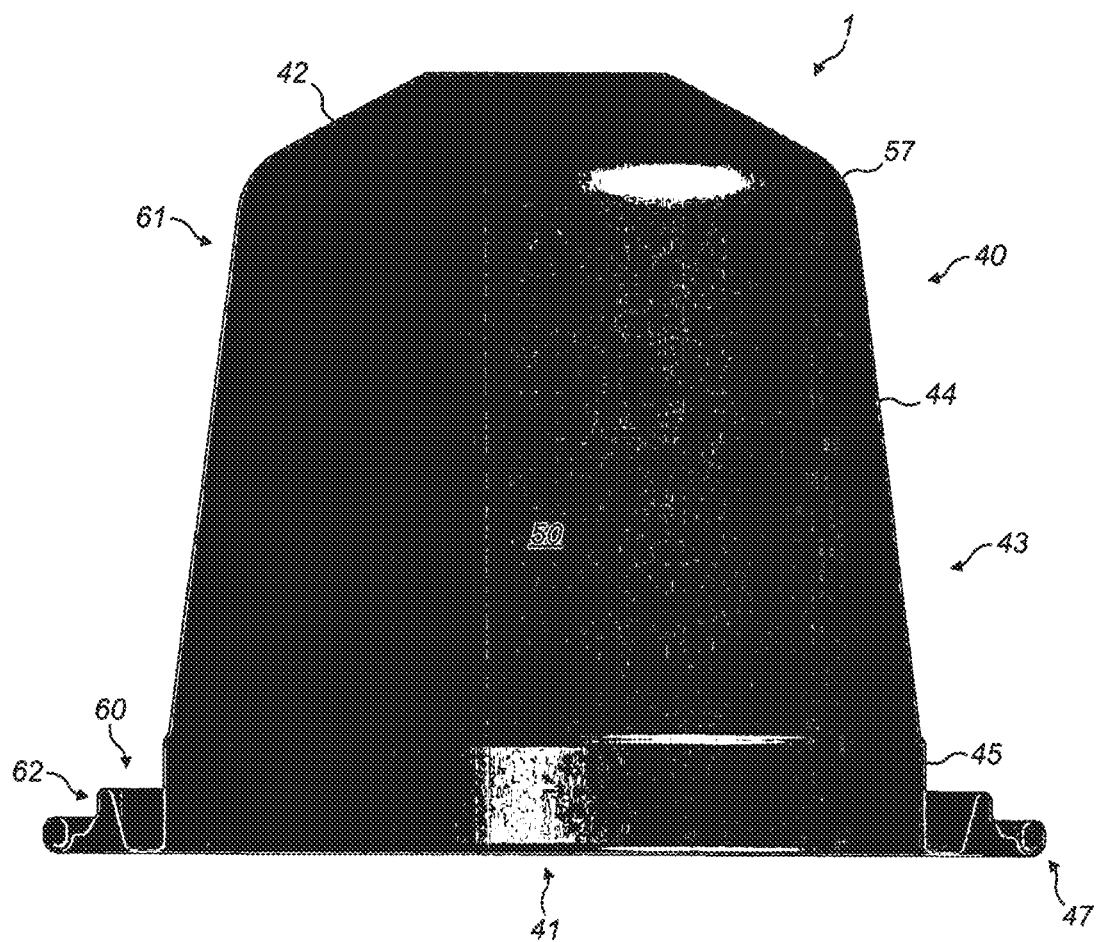
FIG. 13 is a cross-sectional view of a third embodiment of capsule according to the present disclosure.
Figure 14:
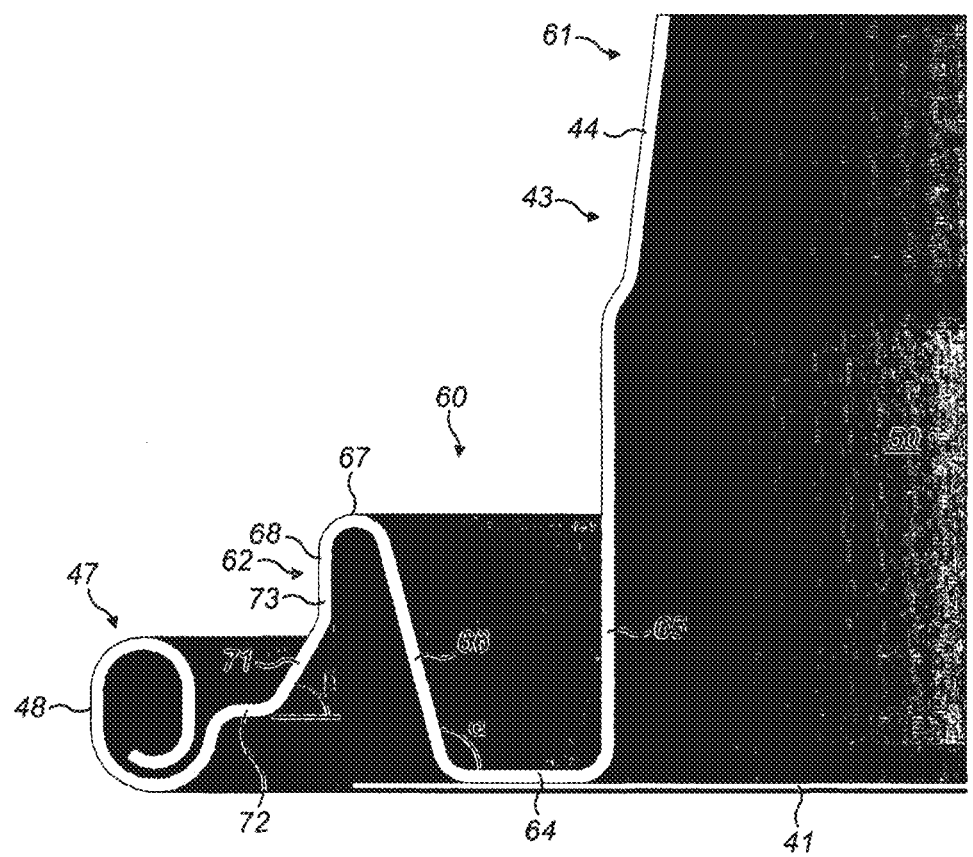
FIG. 14 is an enlarged view of a detail of FIG. 13.
Figure 15:
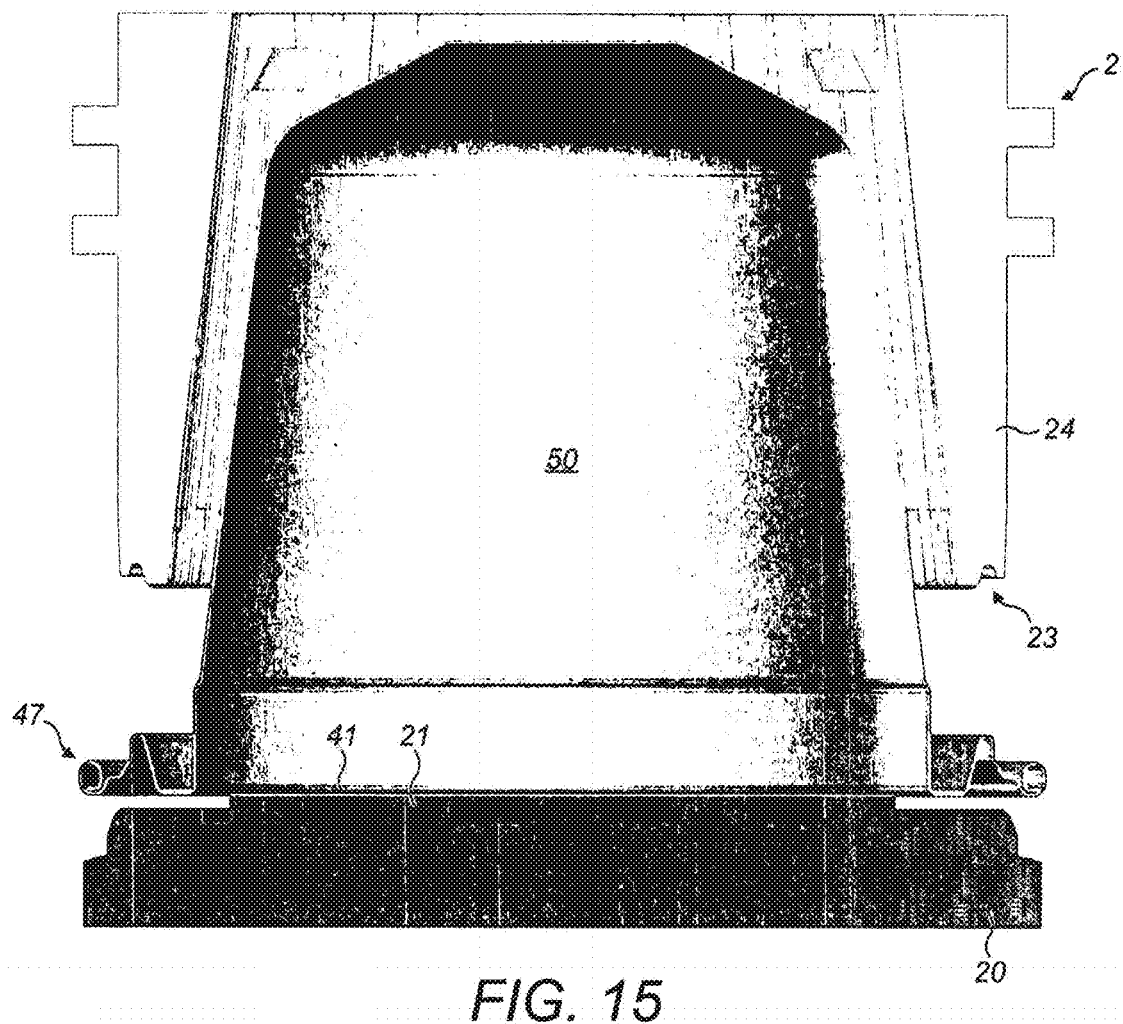
FIG. 15 is a schematic illustration of the capsule of FIG. 13 together with an enclosing member of a beverage preparation machine.
Figure 16:
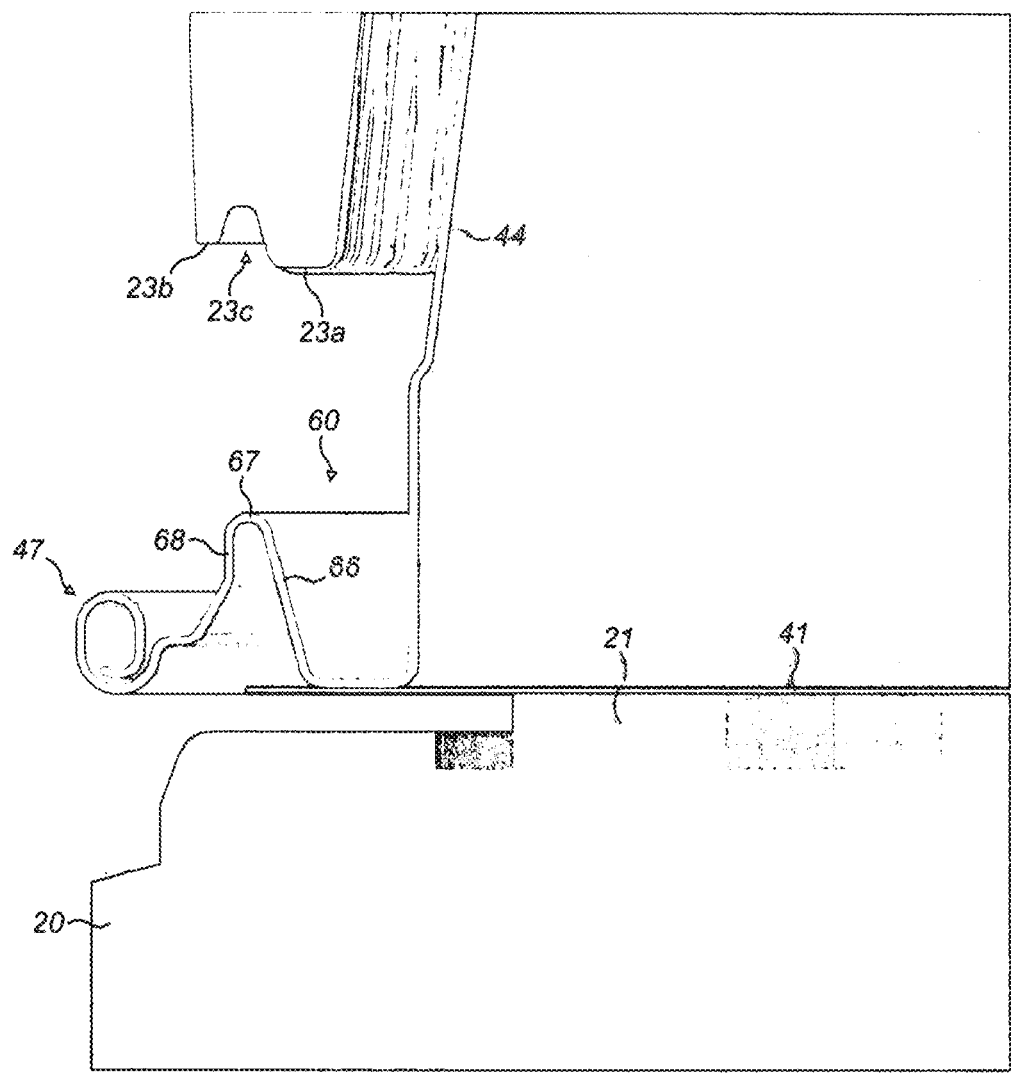
FIG. 16 is an enlarged view of a detail of FIG. 15.

As shown in FIGS. 11 and 12, on closing the enclosing member 2 relative to the capsule holder 20 the side wall 43 of the capsule 1 is contacted by the enclosing member 2 to deform the side wall 43. In particular, the inner rim 23a of the leading edge 23 is received in the annular trough 60 and bears on the outer wall 66 while at the same time (or shortly thereafter) the apex 67 of the ridge zone 63 is received in the recess 23c. The ridge zone 63 (and floor 64) is driven downwards by the action of the enclosing member 2 on the outer wall 66 and/or apex 67 causing the outer wall 66 of the annular trough 60 and the outer wall 68 of the ridge zone 63 to buckle and deform/crumple. During this movement the material of the outer wall 66 of the annular trough 60 may be plastically drawn over the leading edge 23 to conform the outer wall 66 of the annular trough 60 to the grooves or indentations to provide an effective seal.

The downward movement of the ridge zone 63 also nips the floor 64 (and the lid 41 sealed to the floor 64) against the capsule holder 20 as shown in FIG. 12.

The geometry of the outer wall 68 of the ridge zone 63, with the additional annular ridge 70 helps to stiffen the distal end of the side wall 43 and prevent the rim 47 being deflected down into contact with the capsule holder 20.

Downward movement of the enclosing member 2 may continue beyond the point illustrated in FIG. 12 until the inner rim 23a contacts and bears against the floor 64 of the annular trough 60.

Piercing and brewing of a beverage from the capsule 1 may be as described above in the first embodiment.

FIGS. 13 to 18 illustrate a third embodiment of capsule 1. Features corresponding to those of the first and/or second embodiment are denoted by corresponding reference signs. Features of the first and/or second embodiment and this embodiment may be interchanged and combined as desired. In addition, in the following description only differences between the embodiments will be described in detail. In other respects the reader is directed to the description of the prior embodiments.

The cup-shaped body 40 differs from that of the first and second embodiments in the configuration and geometry of the annular trough 60. As in the second embodiment, the annular trough 60 is dimensioned to receive, partially or wholly, the leading edge 23 of the enclosing member 2 on movement of the enclosing member 2 into the closed position. The inner wall 65 of the annular trough 60 is substantially perpendicular to the floor 64 and the outer wall 66 is angled relative to the floor 64, such that an internal angle α at a junction between the floor 64 and the outer wall 66 is from 90° to 120°, preferably 105°.

The ridge zone 63 is again located radially outwards of the annular trough 60 and comprises an annular projection which extends back in the general direction of the base 42 such that an apex 67 of the ridge zone 63 is raised above the level of the floor 64 of the annular trough 60. The apex 67 is somewhat more rounded than in the second embodiment.

The apex 67 may be raised above the floor 64 by a distance from 0.75 to 2.5 mm. As illustrated in this embodiment, the distance is 2.2 mm. The ridge zone 63 may be formed to have an inner wall provided by the angled outer wall 66 of the annular trough 60 and an outer wall 68 formed by at least a portion of the second side wall section 62. As shown most clearly in FIG. 14, the outer wall 68 comprises three distinct sections—an upper section 73 which, prior to insertion, is perpendicular to the floor 64, a mid-section 71 that is angled at an angle β of from 20 to 80°, preferably 60°, to the vertical and a lower section 72 that includes a horizontal portion—parallel to the floor 64—before merging into the rolled-over portion 48 of the rim 47.

The side wall 43, including the annular trough 60 and the ridge zone 63 may be formed integrally. Further, the cup-shaped body 40 including the side wall 43 and the base may be formed integrally.

The annular trough 60 may have an internal width of from 1.3 to 2.0 mm. As illustrated, the annular trough 60 has an internal width of approximately 1.5 mm to 1.8 mm.

As illustrated, the lid 41 is sealed to the annular trough 60. In particular, the lid 41 is sealed to an inner surface of the floor 64 of the annular trough 60. The floor 64 of the annular trough 60 is substantially level with a distal end of the side wall 43 prior to insertion. As illustrated the offset from the distal end of the side wall 43 and the lid is only 0.2 mm.

In use of the beverage preparation system, as shown in FIGS. 15 to 18, as before the enclosing member 2 is first moved into the open position and the capsule 1 is inserted into a location in between the capsule holder 20 and the enclosing member 2.

Figure 17:
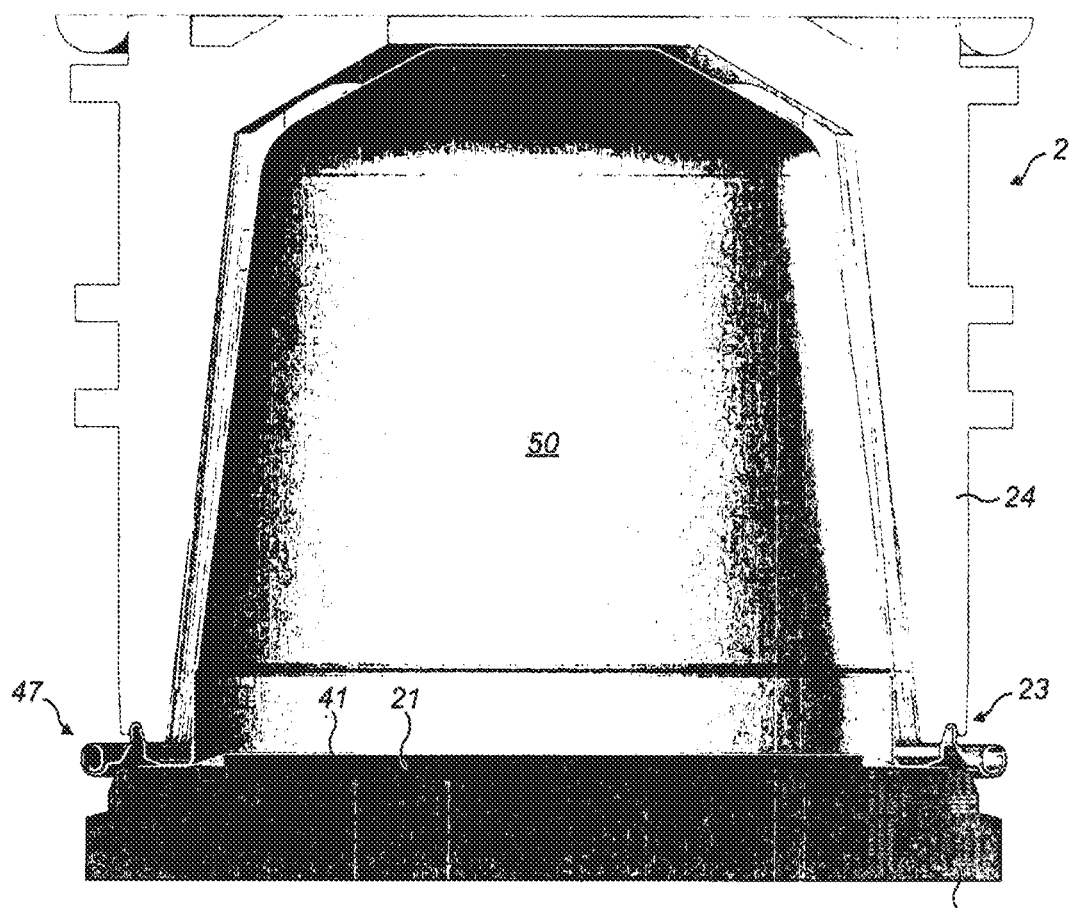
FIG. 17 is a schematic illustration of the arrangement of FIG. 15 with the enclosing member in a closed position.
Figure 18:
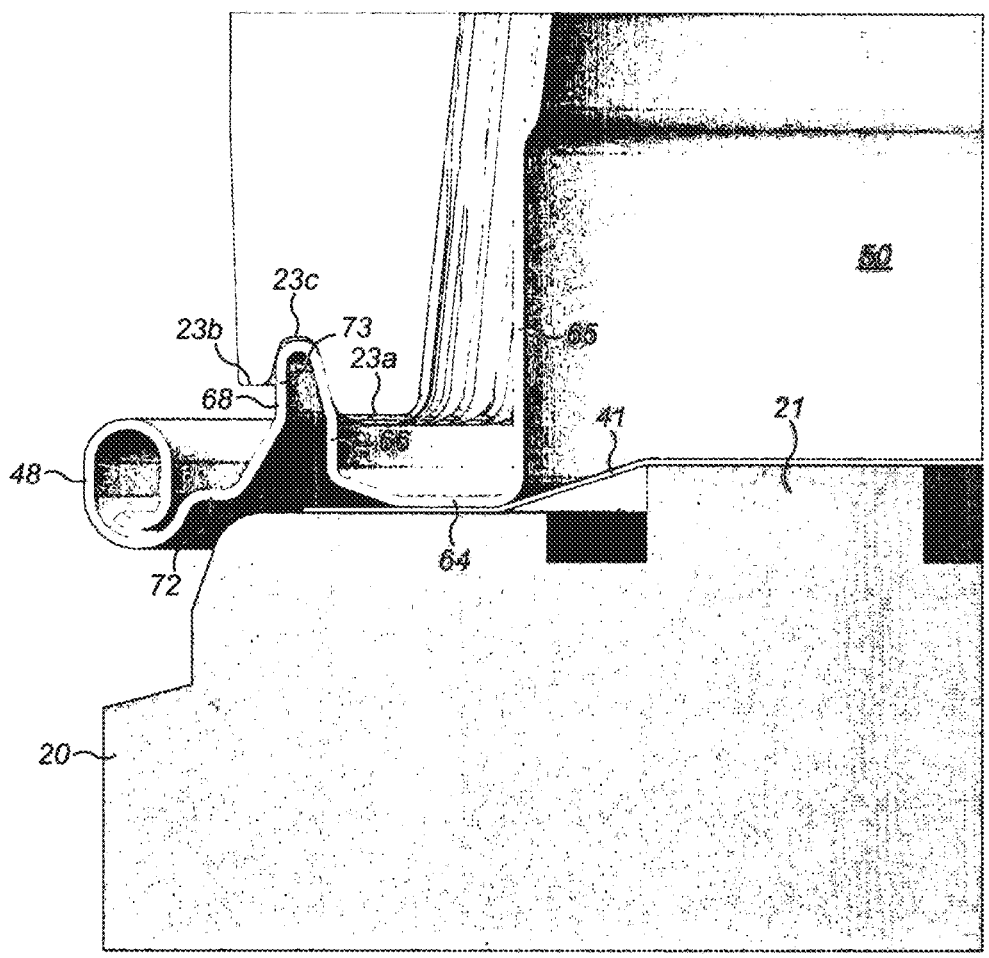
FIG. 18 is an enlarged view of a detail of FIG. 17.

As shown in FIGS. 17 and 18, on closing the enclosing member 2 relative to the capsule holder 20 the side wall 43 of the capsule 1 is contacted by the enclosing member 2 to deform the side wall 43. In particular, the inner rim 23a of the leading edge 23 is received in the annular trough 60 and bears on the outer wall 66 while at the same time (or shortly thereafter) the apex 67 of the ridge zone 63 is received in the recess 23c. The ridge zone 63 (and floor 64) is driven downwards by the action of the enclosing member 2 on the outer wall 66 and/or apex 67 causing the outer wall 66 of the annular trough 60 and the outer wall 68 of the ridge zone 63 to buckle and deform/crumple. During this movement the material of the outer wall 66 of the annular trough 60 may be plastically drawn over the leading edge 23 to conform the outer wall 66 of the annular trough 60 to the grooves or indentations to provide an effective seal.

The downward movement of the ridge zone 63 also nips the floor 64 (and the lid 41 sealed to the floor 64) against the capsule holder 20 as shown in FIG. 12.

The geometry of the outer wall 68 of the ridge zone 63, with the upper section 73, mid-section 71 and lower section 72 helps to stiffen the distal end of the side wall 43 and prevent the rim 47 being deflected down into contact with the capsule holder 20.

Downward movement of the enclosing member 2 may continue beyond the point illustrated in FIG. 12 until the inner rim 23a contacts and bears against the floor 64 of the annular trough 60.

Piercing and brewing of a beverage from the capsule 1 may be as described above in the first embodiment.

The capsule 1 of any of the above embodiments may comprise a side wall 43 formed from a laminate material as discussed above having a polymer layer. Closure of the enclosing member 2 may compress at least the polymer layer of the laminate material when forming any of the sealing interfaces mentioned above. The compression of the polymer layer may aid the conforming of the side wall 43 to the shape of the leading edge 23. In particular the polymer layer may aid filling of any gaps arising due to the presence of grooves in the leading edge 23. Preferably, the polymer layer is directed outwardly to be directly contacted by the leading edge 23. The cup-shaped body 40 may comprise a unitary piece of laminate material.

The laminate, where used, may comprise a ductile structural layer formed from a material such as aluminium or an aluminium alloy together with a resilient layer formed from a polymer. The laminate may comprise only a single layer of aluminium or aluminium alloy together with a single layer of polymer together with one or more optional lacquer layers, tie layers or adhesive layers applied to the aluminium or aluminium alloy.

The polymer layer may, for example, comprise a material selected from the group of: polyvinyl chloride (PVC), polypropylene (PP), low density polyethylene (LDPE), medium density polyethylene (MDPE), high density polyethylene (HDPE), fluorinated ethylene propylene (FEP), polytetrafluoroethylene (PTFE), polyethylene terephthalate (PET), polyamide (PA), ethylene propylene diene monomer (EPDM), polychloroprene or isobutylene.

In addition, during use the hot water passed through the receptacle 3 may act to slightly soften the material of the polymer layer. Such softening may lead to further deformation of the side wall 43 under the compressive loading of the enclosing member 2. This effect may help to reinforce the fluid seal between the enclosing member 2 and the capsule 1 by tending to seal up any gaps having hot water leaking there through.

The deformation of the side wall 43 will also typically cause a reduction in the longitudinal height of the capsule 1 relative to its height prior to insertion.

The invention claimed is:

1. A beverage producing system comprising:
   a capsule containing beverage ingredients; and
   a beverage preparation machine;
   the capsule comprising a cup-shaped body and a lid; the cup-shaped body having a base and a side wall and the lid being sealed to the cup-shaped body;
   the capsule being designed for insertion into the beverage preparation machine to permit a pressurised liquid to be flowed through the capsule in order to produce a beverage from interaction with the beverage ingredients;
   the beverage preparation machine having an enclosing member adapted to be selectively movable between an open position to permit insertion of the capsule into the beverage preparation machine and a closed position in which the enclosing member sealingly engages the capsule;
   wherein, prior to the insertion, the side wall comprises:
      an annular trough;
      a first side wall section extending between the base and the annular trough; and
      a second side wall section extending between the annular trough and a rim of the capsule; wherein the annular trough is between the first side wall section and the second side wall section and dimensioned to receive the enclosing member on movement of the enclosing member into the closed position, wherein, prior to the insertion, the annular trough comprises an inner wall, an outer wall and a floor;
   wherein the base, the side wall, the first side wall section of the side wall, the second side wall section of the side wall, the annular trough, the inner wall of the annular trough, the outer wall of the annular trough, the floor of the trough, and a rolled-over portion of the side wall forming the rim of the capsule are collectively formed from a single integral piece of aluminium or an aluminium alloy thereby forming the cup-shaped body and each have a thickness in a range of 80 to 120 microns;

wherein the annular trough of the side wall undergoes plastic deformation during closure of the enclosing member, thereby forming a sealing interface with a leading edge of the enclosing member.

2. A beverage producing system as claimed in claim 1, wherein:
the second side wall section defines a ridge zone located radially outwards of the annular trough.

3. A beverage producing system as claimed in claim 2, wherein the second side wall section defines a ridge zone located radially outwards of the annular trough and wherein the ridge zone comprises an apex, and the leading edge of the enclosing member comprises an inner rim and an outer rim and a recess located between the inner rim and the outer rim, wherein on closure of the enclosing member the apex of the ridge zone is received in the recess between the inner rim and the outer rim.

4. A beverage producing system as claimed in claim 1, wherein the side wall is adapted such that, in use, closure of the enclosing member deforms the side wall to cause the second side wall section to be forced inwardly against an outer face of the enclosing member to form a sealing interface with the outer face of the enclosing member.

5. A beverage producing system as claimed in claim 1, the side wall is adapted such that during closure of the enclosing member the side wall is plastically drawn over the leading edge of the enclosing member.

6. A beverage producing system as claimed in claim 1, wherein, on closure of the enclosing member the leading edge of the enclosing member contacts the outer wall of the annular trough and forms a seal therewith.

7. A beverage producing system as claimed in claim 6, wherein the outer wall is angled relative to the floor, such that an internal angle at a junction between the floor and the outer wall is 105°.

8. A beverage producing system as claimed in claim 1, wherein:
the inner wall and outer wall are substantially perpendicular to the floor; or
wherein the outer wall is angled relative to the floor, such that an internal angle at a junction between the floor and the outer wall is from 90° to 120°.

9. A beverage producing system as claimed in claim 1, wherein the annular trough is adapted to be nipped against a capsule holder of the beverage preparation machine part.

10. A beverage producing system as claimed in claim 1, wherein, prior to the insertion, the floor of the annular trough is raised relative to the rim; and
optionally, wherein the side wall is adapted such that, in use, closure of the enclosing member deforms the side wall to cause the floor of the annular trough to be brought substantially into alignment with the rim.

11. A beverage producing system as claimed in claim 1, wherein, prior to the insertion, the floor of the annular trough is level with the rim.

12. A beverage producing system as claimed in claim 1, wherein the annular trough has an internal width of from 1.3 to 2.0 mm; and/or
wherein the annular trough has an internal diameter of from 27.5 to 30.0 mm and an outer diameter of from 29.3 to 32.5 mm.

13. A beverage producing system as claimed in claim 1, wherein the leading edge of the enclosing member comprises a plurality of grooves or indentations, and the side wall is adapted such that the plastic deformation of the side wall conforms the annular trough of the side wall to the grooves or indentations to provide an effective seal; and optionally
wherein the plastic deformation of the side wall conforms the outer wall of the annular trough to the grooves or indentations to provide an effective seal.

14. A beverage producing system as claimed in claim 1, wherein the lid is formed from aluminium, an aluminium alloy or a laminate comprising at least one layer formed from aluminium or an aluminium alloy.

15. A beverage producing system as claimed in claim 1, wherein the annular trough has an internal width of from 1.5 to 1.8 mm; and/or
wherein the annular trough has an internal diameter of from 27.5 to 30.0 mm and an outer diameter of from 29.3 to 32.5 mm.

16. A beverage producing system as claimed in claim 1, wherein prior to the insertion, the floor of the annular trough is offset from a distal end of the side wall; and
wherein the side wall is adapted such that, in use, closure of the enclosing member deforms the side wall to cause the floor of the annular trough to be brought substantially into alignment with the rim.

17. A beverage producing system as claimed in claim 1, wherein the leading edge of the enclosing member comprises an inner rim and an outer rim which are concentric and spaced apart from one another to define a recess therebetween; and
wherein the relative dimensions of the leading edge of the enclosing member and the annular trough of the side wall are configured such that on closing the enclosing member, the inner rim of the leading edge of the enclosing member is received in the annular trough and bears on the outer wall while at the same time or shortly thereafter a apex of the ridge zone is received in the recess thereby driving the ridge zone downwards due to the action of the enclosing member on at least one of the outer wall and the apex.

18. A beverage producing system as claimed in claim 17, wherein after the closing of the enclosing member closes, the outer wall of the annular trough and an outer wall of the ridge zone are buckled.

19. A capsule for preparing a beverage comprising a cup-shaped body and a lid; the cup-shaped body having a base and a side wall and the lid being sealed to the cup-shaped body;
the capsule being designed for insertion into a beverage preparation machine to permit a pressurised liquid to be flowed through the capsule in order to produce a beverage from interaction with beverage ingredients contained in the capsule in use;
the beverage preparation machine being of the type having an enclosing member adapted to be selectively movable between an open position to permit insertion of the capsule into the beverage preparation machine and a closed position in which the enclosing member sealingly engages the capsule;
wherein the side wall comprises:
an annular trough;
a first side wall section extending between the base and the annular trough; and
a second side wall section extending between the annular trough and a rim of the capsule; wherein the annular trough is between the first side wall section and the second side wall section and dimensioned to receive the enclosing member, wherein, prior to insertion, the annular trough comprises an inner wall, an outer wall and a floor;

wherein the base, the side wall, the first side wall section of the side wall, the second side wall section of the side wall, the annular trough, the inner wall of the annular trough, the outer wall of the annular trough, the floor of the trough, and a rolled-over portion of the side wall forming the rim of the capsule are collectively formed from a single integral piece of aluminium or an aluminium alloy thereby forming the cup-shaped body and each have a thickness in a range of 80 to 120 microns;

wherein the annular trough of the side wall undergoes plastic deformation during closure of the enclosing member, thereby forming a sealing interface with a leading edge of the enclosing member.

20. A capsule as claimed in claim 19, the second side wall section defines a ridge zone located radially outwards of the annular trough.

21. A capsule as claimed in claim 19, wherein the floor of the annular trough is raised relative to the rim.

22. A capsule as claimed in claim 19, wherein the floor of the annular trough is level with the rim.

23. A capsule as claimed in claim 19, wherein: the lid is formed from aluminium, an aluminium alloy or a laminate comprising at least one layer formed from aluminium or an aluminium alloy.

24. A method for preparing a beverage comprising the steps of:
providing a capsule as claimed in claim 19;
providing a beverage preparation machine having an enclosing member;
moving the enclosing member into an open position;
inserting the capsule into the beverage preparation machine;
closing the enclosing member so as to sealingly engage the enclosing member with the capsule;
flowing a pressurised liquid through the capsule to produce a beverage from interaction with the beverage ingredients; and
outputting the beverage for consumption;
wherein on closure, the enclosing member engages the annular trough of the side wall of the capsule to thereby deform the side wall;
wherein said deformation of the side wall causes the formation of at least one sealing interface between the enclosing member and the side wall.

25. A capsule as claimed in claim 19 wherein: the inner wall and outer wall are substantially perpendicular to the floor; or wherein the outer wall is angled relative to the floor, such that an internal angle at a junction between the floor and the outer wall is from 90° to 120°.

26. A capsule as claimed in claim 19 wherein the outer wall is angled relative to the floor, such that an internal angle at a junction between the floor and the outer wall is 105°.

27. A capsule as claimed in claim 19 wherein the annular trough has an internal width of from 1.3 to 2.0 mm.

28. A capsule as claimed in claim 19 wherein the annular trough has an internal width of from 1.5 to 1.8 mm.

29. A capsule as claimed in claim 19 wherein the annular trough has an internal diameter of from 27.5 to 30.0 mm and an outer diameter of from 29.3 to 32.5 mm.

30. A capsule as claimed in claim 19, wherein the side wall comprises a frustoconical section proximate the base.

31. A capsule as claimed in claim 30, wherein the side wall comprises a cylindrical section between the frustoconical section and the annular trough.

32. A capsule as claimed in claim 19, wherein the second side wall section defines a ridge zone located radially outwards of the annular trough and wherein the ridge zone comprises an apex, and the leading edge of the enclosing member comprises an inner rim and an outer rim and a recess located between the inner rim and the outer rim, wherein on closure of the enclosing member the apex of the ridge zone is received in the recess between the inner rim and the outer rim.

33. A capsule as claimed in claim 19, wherein a floor of the annular trough is offset from a distal end of the side wall; and
wherein the side wall is adapted such that, in use, closure of the enclosing member deforms the side wall to cause the floor of the annular trough to be brought substantially into alignment with the rim.

34. A capsule as claimed in claim 19,
wherein the leading edge of the enclosing member comprises an inner rim and an outer rim which are concentric and spaced apart from one another to define a recess therebetween; and
wherein the relative dimensions of the leading edge of the enclosing member and the annular trough of the side wall are configured such that on closing the enclosing member, the inner rim of the leading edge of the enclosing member is received in the annular trough and bears on the outer wall while at the same time or shortly thereafter the apex of a ridge zone is received in the recess thereby driving the ridge zone downwards due to the action of the enclosing member on at least one of the outer wall and the apex.

35. A capsule as claimed in claim 34, wherein after the closing of the enclosing member closes, the outer wall of the annular trough and an outer wall of the ridge zone are buckled.

* * * * *